(12) United States Patent
Kamihira et al.

(10) Patent No.: US 11,479,890 B2
(45) Date of Patent: Oct. 25, 2022

(54) NON-TRANSITORY COMPUTER-READABLE STORAGE MEDIUM, EMBROIDERY PATTERN DISPLAYING DEVICE, AND METHOD

(71) Applicant: BROTHER KOGYO KABUSHIKI KAISHA, Nagoya (JP)

(72) Inventors: Yuta Kamihira, Aichi-ken (JP); Kazuki Kojima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/689,890

(22) Filed: Nov. 20, 2019

(65) Prior Publication Data

US 2020/0087827 A1    Mar. 19, 2020

Related U.S. Application Data

(63) Continuation of application No. 15/980,317, filed on May 15, 2018, now Pat. No. 10,519,581, which is a continuation of application No. PCT/JP2016/075798, filed on Sep. 2, 2016.

(30) Foreign Application Priority Data

Nov. 27, 2015 (JP) .............................. JP2015-232182

(51) Int. Cl.
*D05B 19/12* (2006.01)
*D05B 19/08* (2006.01)
(Continued)

(52) U.S. Cl.
CPC .............. *D05B 19/12* (2013.01); *D05B 19/08* (2013.01); *G06T 7/11* (2017.01); *G06T 11/60* (2013.01); *G06T 19/006* (2013.01); *G06T 19/20* (2013.01)

(58) Field of Classification Search
CPC ........ D05B 19/08; D05B 19/10; D05B 19/12; D05C 5/00; D05C 5/02; G06T 19/006
See application file for complete search history.

(56) References Cited

U.S. PATENT DOCUMENTS 4,998,489 A * 3/1991 Hisatake ................ D05B 19/08
                                                                      112/103
2009/0188413 A1 * 7/2009 Hirata .................... D05B 19/10
                                                                      112/103
(Continued)

FOREIGN PATENT DOCUMENTS

JP    2005-185297 A    7/2005
JP    2010-246885 A    11/2010
(Continued)

OTHER PUBLICATIONS

Nov. 22, 2016 Search Report issued in International Patent Application No. PCT/JP2016/075798.
(Continued)

*Primary Examiner* — Nathan E Durham
(74) *Attorney, Agent, or Firm* — Oliff PLC

(57) ABSTRACT

A non-transitory computer-readable medium stores computer-readable instructions. The instructions, when executed, cause a processor of an embroidery pattern displaying device provided with a capturing portion and a displaying portion to perform steps. The steps include detecting a marker associated with an embroidery pattern arranged within an augmented reality space from a real image that is an image of a real space captured by the capturing portion. The steps include displaying, when the marker is detected from the real image, a pattern image indicating the embroidery pattern associated with the detected marker, superimposed on the real image with the detected marker as a reference, on the displaying portion.

20 Claims, 10 Drawing Sheets

(51) Int. Cl.
  *G06T 7/11*   (2017.01)
  *G06T 19/20*  (2011.01)
  *G06T 11/60*  (2006.01)
  *G06T 19/00*  (2011.01)

(56) References Cited

U.S. PATENT DOCUMENTS

| | | |
|---|---|---|
| 2010/0242817 A1 | 9/2010 | Tokura |
| 2011/0282479 A1* | 11/2011 | Tokura .................. D05B 19/12 700/108 |
| 2014/0230707 A1* | 8/2014 | Suzuki .................. D05B 19/12 112/102.5 |
| 2015/0059631 A1 | 3/2015 | Katano et al. |
| 2016/0215423 A1 | 7/2016 | Kongo et al. |

FOREIGN PATENT DOCUMENTS

| | | |
|---|---|---|
| JP | 2013-74971 A | 4/2013 |
| JP | 2014-115957 A | 6/2014 |
| JP | 2015-048537 A | 3/2015 |
| JP | 2016-135163 A | 7/2016 |

OTHER PUBLICATIONS

May 29, 2018 International Preliminary Report on Patentability issued in International Patent Application No. PCT/JP2016/075798.

\* cited by examiner

NON-TRANSITORY COMPUTER-READABLE STORAGE MEDIUM, EMBROIDERY PATTERN DISPLAYING DEVICE, AND METHOD

CROSS-REFERENCE TO RELATED APPLICATION

This application is a continuation application of U.S. Ser. No. 15/980,317, filed on May 15, 2018, which is a bypass continuation of International Application No. PCT/JP2016/075798, filed Sep. 2, 2016, which claims priority from Japanese Patent Application No. 2015-232182, filed on Nov. 27, 2015. The disclosure of the foregoing application is hereby incorporated by reference in its entirety.

BACKGROUND

The present disclosure relates to a non-transitory computer-readable storage medium, an embroidery pattern displaying device, and a method.

In the past, as augmented reality (AR) technology, there is known an image processing device that displays a virtual object corresponding to an image of a marker in a captured image. The above described image processing device captures an image of a planned place of construction of a building and obtains a landscape image. The image processing device identifies a marker in the landscape image. The image processing device aligns a building image with the landscape image, with the identified marker as a reference, and displays the building image superimposed on the landscape image.

SUMMARY

Technology for determining the arrangement of an embroidery pattern with respect to a sewing workpiece using AR technology has not been thoroughly studied.

Various embodiments of the broad principles derived herein provide a non-transitory computer-readable storage medium, an embroidery pattern displaying device, and a method that make it possible to ascertain a finished image of an embroidery pattern when the embroidery pattern is arranged with respect to a sewing workpiece using AR technology.

Embodiments herein provide a non-transitory computer-readable medium storing computer-readable instructions. The instructions, when executed, cause a processor of an embroidery pattern displaying device provided with a capturing portion and a displaying portion to perform steps that include detecting a marker associated with an embroidery pattern arranged within an augmented reality space from a real image that is an image of a real space captured by the capturing portion, and displaying, when the marker is detected from the real image, a pattern image indicating the embroidery pattern associated with the detected marker, superimposed on the real image with the detected marker as a reference, on the displaying portion.

Embodiments herein also provide an embroidery pattern displaying device includes a capturing portion, a displaying portion, a processor, and a memory. The capturing portion is configured to capture a real image that is an image of a real space of an object. The displaying portion is configured to display the real image captured by the capturing portion, and a pattern image indicating an embroidery pattern. The memory stores computer-readable instructions that, when executed by the processor, cause the embroidery pattern displaying device to detect a marker associated with the embroidery pattern arranged within an augmented reality space, from the real image captured by the capturing portion, and display, when the marker is detected, the pattern image indicating the embroidery pattern associated with the detected marker, superimposed on the real image captured by the capturing portion with the detected marker as a reference, on the displaying portion.

Embodiments herein also provide a method of controlling an embroidery pattern displaying device provided with a capturing portion and a displaying portion. The method includes detecting a marker associated with the embroidery pattern arranged within an augmented reality space, from a real image that is an image of a real space captured by the capturing portion. The method includes displaying, when the marker is detected, the pattern image indicating the embroidery pattern associated with the detected marker, superimposed on the real image captured by the capturing portion with the detected marker as a reference, on the displaying portion.

BRIEF DESCRIPTION OF THE DRAWINGS

Embodiments will be described below in detail with reference to the accompanying drawings in which.

DETAILED DESCRIPTION

Figure 1:
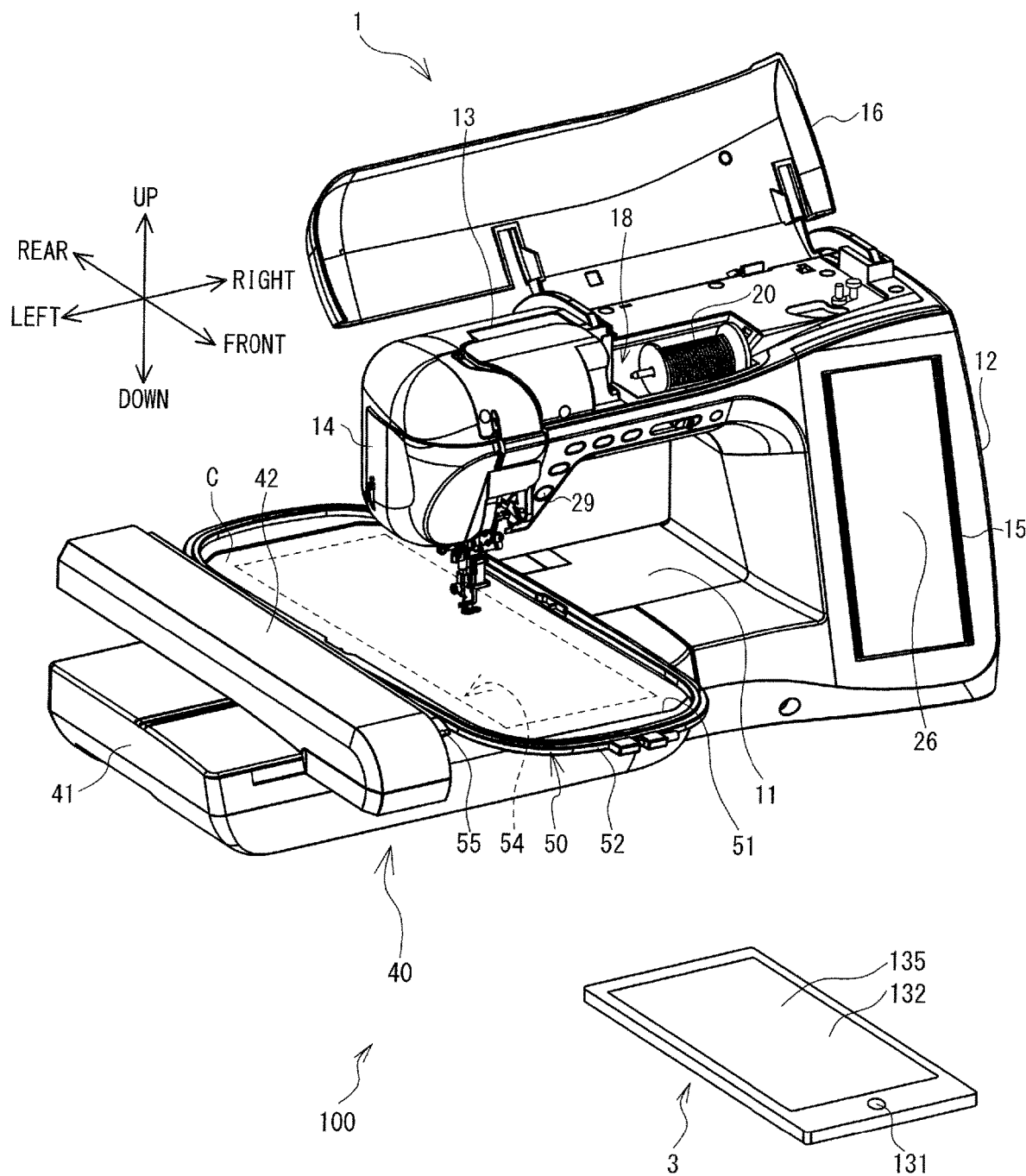
FIG. 1 is a perspective view of a sewing machine and an embroidery pattern displaying device.

Embodiments of the present disclosure will be described with reference to the drawings. The physical configuration of a sewing system 100 that includes a sewing machine 1 and an embroidery pattern displaying device 3 (hereinafter, simply referred to as "device 3") will be described with reference to FIG. 1 and FIG. 2. The up and down direction, lower right side, upper left side, lower left side, and upper right side in FIG. 1 are the up and down direction, to the front, to the rear, to the left, and to the right, respectively, with respect to the sewing machine 1 and the device 3. That is, the surface on which a liquid crystal display (hereinafter, simply referred to as LCD) 15, described later, is arranged is a front surface of the sewing machine 1. The longitudinal direction of a bed portion 11 and an arm portion 13 is the left-right direction of the sewing machine 1. The side on which a pillar portion 12 is arranged is the right side. The extending direction of the pillar portion 12 is the up and down direction of the sewing machine 1. In the present specification, image data to be processed by a computer is also referred to simply as "image."

[1. Physical configuration of sewing machine 1 and embroidery frame 50]

As illustrated in FIG. 1, the sewing machine 1 has the bed portion 11, the pillar portion 12, the arm portion 13, and a head portion 14. The bed portion 11 is a base portion of the sewing machine 1 that extends in the left-right direction. The pillar portion 12 stands upright, extending upward from the right end portion of the bed portion 11. The arm portion 13 extends toward the left from the upper end of the pillar portion 12 so as to face the bed portion 11. The head portion 14 is a portion that connects to the left distal end portion of the arm portion 13.

The bed portion 11 includes a needle plate 21 (refer to FIG. 2) on the upper surface of the bed portion 11. The needle plate 21 has a needle hole (not shown in the drawings) through which a sewing needle 7, described later, is able to be inserted. A sewing workpiece (e.g., work cloth), not shown, is placed on the upper surface of the needle plate 21. The sewing machine 1 includes a feed dog, a feed mechanism, and a shuttle mechanism and the like, not shown, on the lower side of the needle plate 21, i.e., inside the bed portion 11. The feed dog is driven by the feed mechanism during normal sewing, which is not embroidery sewing, and moves the sewing workpiece a predetermined movement amount. The shuttle mechanism twists an upper thread (not shown in the drawings) with a lower thread (not shown in the drawings) below the needle plate 21.

The sewing machine 1 includes a movement mechanism 40. The movement mechanism 40 is configured to be able to relatively move a sewing workpiece C (hereinafter, also referred to as "object") held by an embroidery frame 50 with respect to an image sensor 35 and a needle bar 6 that will be described later. The movement mechanism 40 includes a carriage 42 and a main body portion 41. The carriage 42 includes a frame holder (not shown in the drawings), a Y-axis movement mechanism (not shown in the drawings), and a Y-axis motor 84 (refer to FIG. 3). The frame holder is provided on the right side surface of the carriage 42. One embroidery frame 50 selected from among a plurality of types of embroidery frames 50 that differ in shape and size can be attached to and detached from the frame holder. The Y-axis movement mechanism moves the frame holder in the front-rear direction (Y-axis direction). The Y-axis motor 84 drives the Y-axis movement mechanism.

The embroidery frame 50 of the present embodiment has a first frame member 51, a second frame member 52, and an attachment portion 55, and is able to hold the sewing workpiece C with the first frame member 51 and the second frame member 52. A sewing area 54 set within the embroidery frame 50 is a region where the sewing machine 1 can form stitches. The attachment portion 55 is a portion that attaches to the frame holder. The attachment portion 55 has a shape unique to the embroidery frame 50. When the embroidery frame 50 is attached to the frame holder of the movement mechanism 40, the sewing machine 1 can identify that the embroidery frame 50 has been attached as well as identify the type of the embroidery frame 50, on the basis of the unique shape of the attachment portion 55 detected by a detector 36 (refer to FIG. 3) that will be described later.

The main body portion 41 includes an X-axis movement mechanism (not shown in the drawings) and an X-axis motor 83 (refer to FIG. 3) inside the main body portion 41.

The X-axis movement mechanism moves the carriage 42 in the left-right direction (X-axis direction). The X-axis motor 83 drives the X-axis movement mechanism. The movement mechanism 40 can move the embroidery frame 50 that is attached to the carriage 42 (more specifically, the frame holder) to a position indicated by a particular XY coordinate system (embroidery coordinate system). In the embroidery coordinate system, directions to the right, left, forward, and rearward with respect to the sewing machine 1 are an X plus direction, an X minus direction, a Y minus direction, and a Y plus direction, for example.

The LCD 15 is provided on the front surface of the pillar portion 12. An image that includes a variety of items such as commands, illustrations, setting values, messages, and the like is displayed on the LCD 15. A touch panel 26 capable of detecting a pressed position is provided on the front surface side of the LCD 15. When a user performs a pressing operation with respect to the touch panel 26 using a finger or a stylus pen (not shown in the drawings), the pressed position is detected by the touch panel 26. A CPU 61 (refer to FIG. 3) of the sewing machine 1 detects a selected item in the image, on the basis of the detected pressed position. Hereinafter, the pressing operation with respect to the touch panel 26 by the user will be referred to as a panel operation. The user can select a pattern to be sewn and a command to be executed and the like by a panel operation. The pillar portion 12 includes a sewing machine motor 81 (refer to FIG. 3) inside the pillar portion 12.

A cover 16 that can be opened and closed is provided on an upper portion of the arm portion 13. FIG. 1 illustrates a state in which the cover 16 is open. A thread storage portion 18 is provided below the cover 16 (that is, inside the arm portion 13). The thread storage portion 18 can store a thread spool 20 around which the upper thread is wound. A main shaft (not shown in the drawings) that extends in the left-right direction is provided inside the arm portion 13. The main shaft is rotatably driven by the sewing machine motor 81. Various switches including a start/stop switch 29 are provided on a lower left portion of the front surface of the arm portion 13. The start/stop switch 29 starts and stops operation of the sewing machine 1. That is, the start/stop switch 29 is used to input commands to start and stop sewing.

Figure 2:
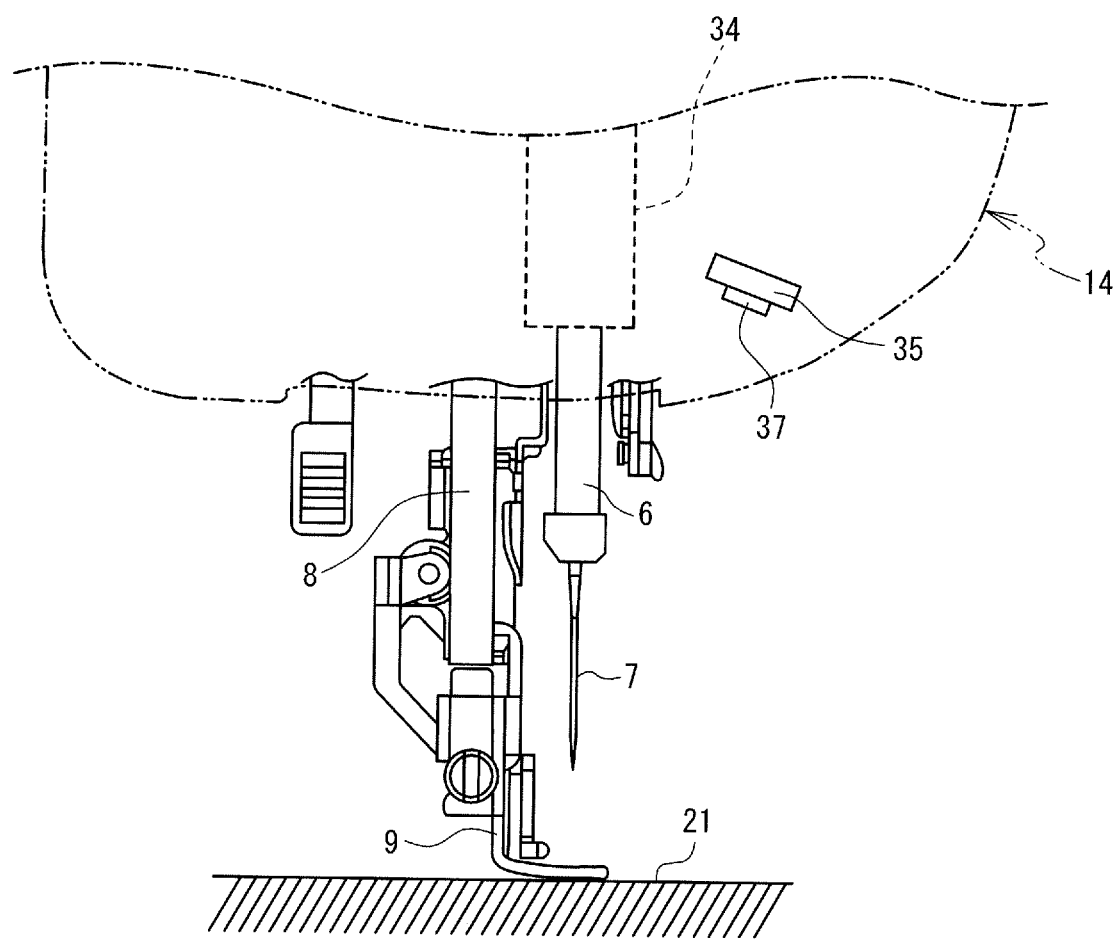
FIG. 2 is an explanatory view illustrating a configuration of a lower end portion of a head portion.

As illustrated in FIG. 2, the needle bar 6, a presser bar 8, and a needle bar up-and-down movement mechanism 34 and the like are provided at the head portion 14. The sewing needle 7 is detachably attached to the lower end of the needle bar 6. A presser foot 9 is detachably attached to the lower end portion of the presser bar 8. The needle bar 6 is provided at the lower end of the needle bar up-and-down movement mechanism 34. The needle bar up-and-down movement mechanism 34 drives the needle bar 6 in the up and down direction by the rotation of the main shaft.

The image sensor 35 having a predetermined capture area is provided inside the head portion 14. The image sensor 35 is a well-known Complementary Metal Oxide Semiconductor (CMOS) image sensor, for example. The image sensor 35 is a publicly known area sensor in which a plurality of pickup elements 37 lined up in a main scanning direction (for example, a plurality of CMOS), and are arranged in a plurality of rows in a sub-scanning direction. In the present embodiment, the main scanning direction corresponds to the X-axis direction (left-right direction) of the sewing machine 1, and the sub-scanning direction corresponds to the Y-axis direction (the front-rear direction).

The image sensor 35 is arranged so as to be able to capture a region that includes an area below the needle bar 6, and can output image data. The outputted image data is stored in a predetermined storage area of a RAM 63 (refer to FIG. 3). A coordinate system of the image indicated by the image data outputted from the image sensor 35 (hereinafter, also referred to as "image coordinate system") and a coordinate system of the entire space (hereinafter, also referred to as "world coordinate system") are associated beforehand by a parameter stored in a flash memory 64 (refer to FIG. 3). The world coordinate system and the embroidery coordinate system are associated beforehand by a parameter stored in the flash memory 64. Therefore, the sewing machine 1 can perform processing that identifies the coordinates in the embroidery coordinate system on the basis of the image data outputted from the image sensor 35.

[2. Physical Configuration of Device 3]

The physical configuration of the device 3 will be described with reference to FIG. 1. The device 3 is a well-known tablet-type personal computer (PC). The device 3 includes an operating switch 131, a displaying portion 135, and a touch panel 132 on the upper surface of the device 3. The operating switch 131 is used when inputting various commands into the device 3. An image that includes various items such as commands, illustrations, setting values messages, and the like is displayed on the displaying portion 135. The touch panel 132 is provided on the front side surface of the displaying portion 135, and can detect a pressed position. When the user performs a pressing operation with respect to the touch panel 132 using a finger or a special touch pen, the pressed position is detected by the touch panel 132. A selected item in the image is detected on the basis of the detected pressed position. The device 3 includes an image sensor 134 (refer to FIG. 3) on a bottom surface. The image sensor 134 is a well-known CMOS image sensor, for example.

[3. Electrical Configuration of Sewing Machine 1]

Figure 3:
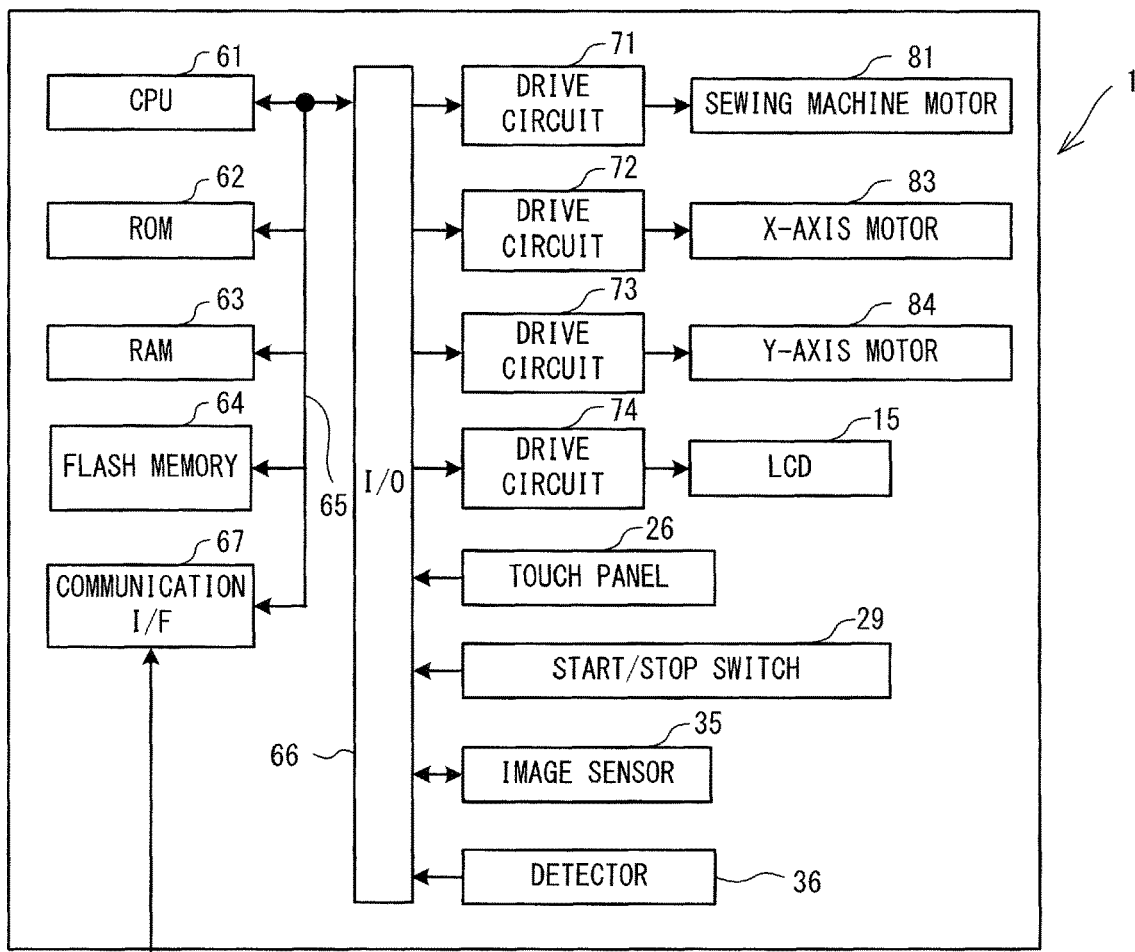
FIG. 3 is a block diagram illustrating an electrical configuration of the sewing machine and the embroidery pattern displaying device.
Figure 3:
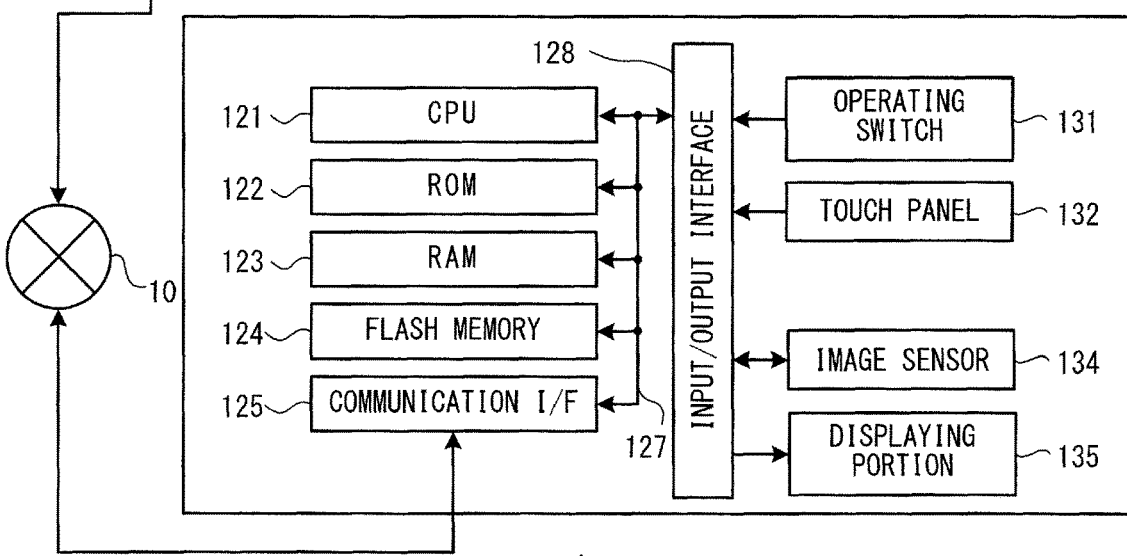

The electrical configurations of the sewing machine 1 and the device 3 of the sewing system 100 will be explained in order with reference to FIG. 3. As illustrated in FIG. 3, the sewing machine 1 includes the CPU 61, a ROM 62, the RAM 63, the flash memory 64, an input/output interface (I/O) 66, and a communication I/F 67. The CPU 61 is connected to the ROM 62, the RAM 63, the flash memory 64, the input/output I/O 66, and the communication I/F 67 via a bus 65.

The CPU 61 is responsible for the main control of the sewing machine 1, and performs various calculations and processing related to capturing and sewing, in accordance with various programs stored in the ROM 62. Although not shown, the ROM 62 includes a plurality of storage areas including a program storage area. Various programs for operating the sewing machine 1 (for example, a program for performing main processing that will be described later) are stored in the program storage area.

A storage area within which is stored calculation results and the like calculated by the CPU 61 is provided in the RAM 63. The flash memory 64 includes a plurality of storage areas in which are stored various parameters and the like for the sewing machine 1 to perform various processing. The plurality of storage areas of the flash memory 64 include a marker storage area 68, an embroidery data storage area 69, and a sewing area storage area 70, which will be described later with reference to FIG. 4. Drive circuits 71 to 74, the touch panel 26, the start/stop switch 29, the image sensor 35, and the detector 36 are connected to the input/output I/O 66. The detector 36 is configured to detect that the embroidery frame 50 is attached to the movement mechanism 40, and output a detection result that corresponds to the type of the embroidery frame 50.

The sewing machine motor 81 is connected to the drive circuit 71. The drive circuit 71 drives the sewing machine motor 81 in accordance with a control signal from the CPU 61. The needle bar up-and-down movement mechanism 34 (refer to FIG. 2) is driven via the main shaft (not shown in the drawings) of the sewing machine 1 with the driving of the sewing machine motor 81, such that the needle bar 6 moves up and down. The X-axis motor 83 is connected to the drive circuit 72. The Y-axis motor 84 is connected to the drive circuit 73. The drive circuits 72 and 73 drive the X-axis motor 83 and the Y-axis motor 84, respectively, in accordance with control signals from the CPU 61. The embroidery frame 50 that is attached to the movement mechanism 40 moves in the left-right direction (X-axis direction) and the front-rear direction (Y-axis direction) by a movement amount corresponding to the control signals, with the driving of the X-axis motor 83 and the Y-axis motor 84. The drive circuit 74 displays an image on the LCD 15 by driving the LCD 15 in accordance with a control signal from the CPU 61. The communication I/F 67 is an interface for connecting the sewing machine 1 to a network 10. The CPU 61 can send and receive data to and from other devices (the device 3, for example) that connect to the network 10, via the communication I/F 67.

The operation of the sewing machine 1 will now be briefly described. At the time of embroidery sewing using the embroidery frame 50, the embroidery frame 50 is moved in the X-axis direction and the Y-axis direction by the movement mechanism 40, and the needle bar up-and-down movement mechanism 34 (refer to FIG. 2) and the shuttle mechanism (not shown in the drawings) are driven. As a result, an embroidery pattern is sewn onto the sewing workpiece C held by the embroidery frame 50, by the sewing needle 7 that is attached to the needle bar 6.

[4. Electrical Configuration of Device 3]

Figure 4:
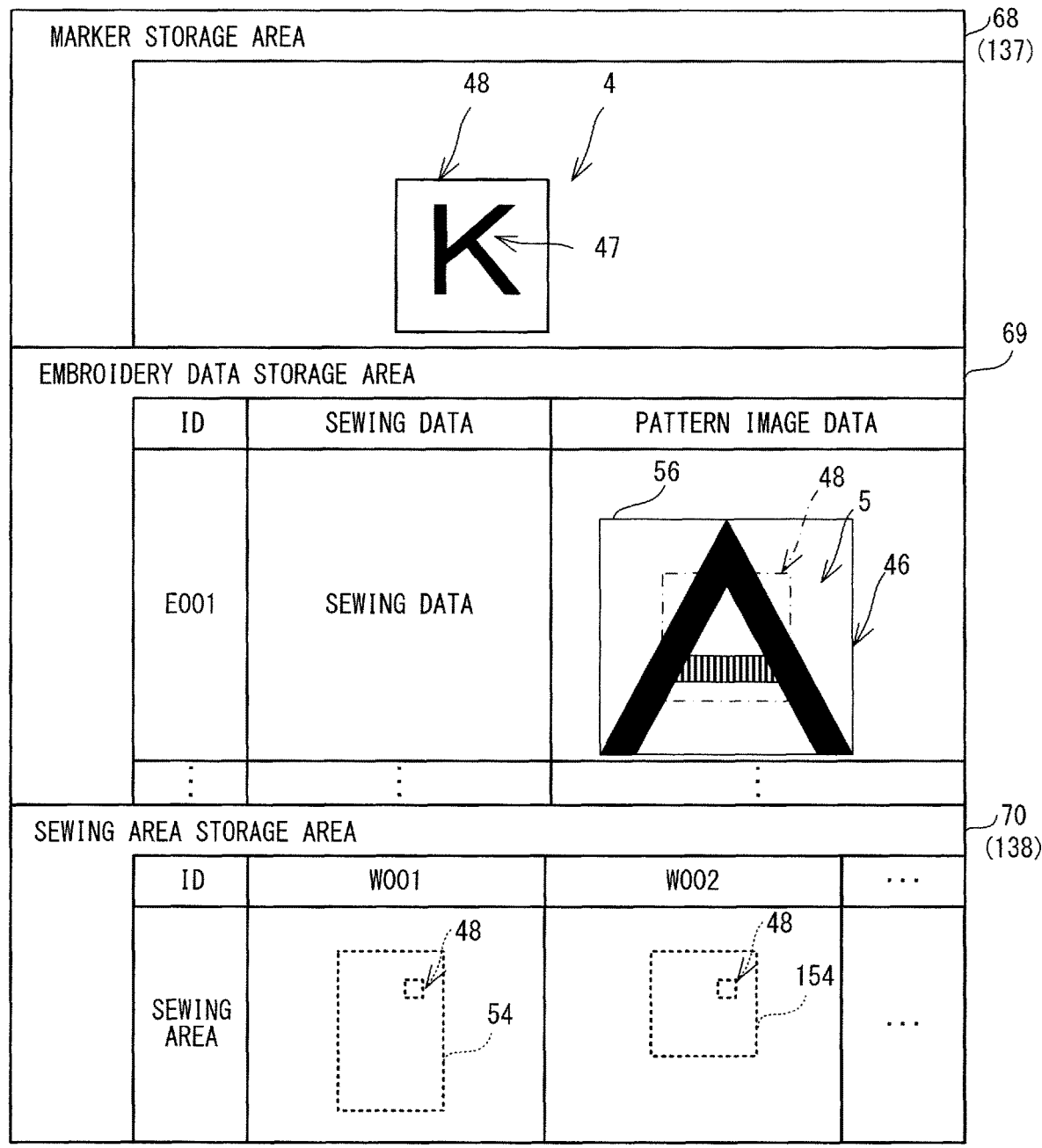
FIG. 4 is an explanatory view of a marker storage area, an embroidery data storage area, and a sewing area storage area of flash memory.

As illustrated in FIG. 3, the device 3 includes a CPU 121, a ROM 122, a RAM 123, a flash memory 124, a communication I/F 125, and an input/output interface 128. The CPU 121 is responsible for controlling the device 3. The CPU 121 is electrically connected to the ROM 122, the RAM 123, the flash memory 124, the communication I/F 125, and the input/output interface 128 via a bus 127. A boot program and BIOS and the like are stored in the ROM 122. Temporary data is stored in the RAM 123. Various setting values, including a marker storage area 137 and a sewing area storage area 138, which will be described later with reference to FIG. 4, are stored in the flash memory 124. The communication I/F 125 is an interface for connecting the device 3 to the network 10. The CPU 121 can send and receive data to and from other devices (the sewing machine 1, for example) that connect to the network 10, via the communication I/F 125.

The input/output interface 128 is connected to the operating switch 131, the touch panel 132, the image sensor 134, and the displaying portion 135. The image sensor 134 outputs image data obtained by capturing a predetermined capture area. The outputted image data is stored in the RAM 123. The displaying portion 135 is a liquid crystal display.

[5. Storage Area of Flash Memory 64 and 124]

The marker storage area 68, the embroidery data storage area 69, and the sewing area storage area 70 will now be described in order with reference to FIG. 4. The marker storage area 68, the embroidery data storage area 69 and the sewing area storage area 70 are provided in the flash memory 64 of the sewing machine 1. The marker storage area 68 stores data indicating a marker 4 used when embroidery pattern editing processing is performed by the sewing system 100. The data indicating the marker 4 is used in processing that extracts the marker 4 from the images obtained from the image sensors 35 and 134. The data indicating the marker 4 may be image data indicating the marker 4, or numerical data indicating the size and shape of the marker 4, for example.

The marker 4 serves as a reference for the size and arrangement of an embroidery pattern 5 when editing an embroidery pattern to be sewn by the device 3. The marker 4 further serves as a reference when arranging the embroidery pattern based on the marker 4 in accordance with the editing content in the device 3, in the sewing machine 1. The marker 4 is associated with the embroidery pattern to be sewn. Therefore, the marker 4 may be any marker that is captured by both the device 3 and the sewing machine 1, and from which the size and position of the marker 4 can be detected from the obtained image. The marker 4 includes a white thin sheet-like sheet, and a line-drawing that is drawn in black on the surface of the sheet. A transparent adhesive is applied to the back surface of the sheet. The user is able to adhere the sheet onto the sewing workpiece C. The line-drawing drawn on the upper surface of the sheet includes a character pattern 47 and a graphic pattern 48. The character pattern 47 is a pattern representing an uppercase letter K. The graphic pattern 48 is a pattern representing a square. The data indicating the marker 4 is image data indicating the surface of the marker 4. The left-right direction and the up and down direction in FIG. 4 correspond to the X direction and the Y direction in the embroidery coordinate system, respectively. The flash memory 124 of the device 3 has the marker storage area 137 and stores data indicating the marker 4, similar to the marker storage area 68.

The embroidery data storage area 69 stores embroidery data, which is data indicating an embroidery pattern, for each of a plurality of embroidery patterns. The embroidery data includes an ID, sewing data, and pattern image data. The ID is a unique identifier given to each of the plurality of embroidery patterns. The ID is a character string in which letters and numbers are combined. The sewing data includes coordinate data for each thread color data. The thread color data is data indicating the color of thread forming a stitch. The coordinate data is data indicating a stitch forming position (needle drop position) included in the embroidery pattern by coordinates in the embroidery coordinate system. That is, the sewing data includes data indicating the stitch forming position for each stitch color. The pattern image data is data that indicates a pattern image 46 indicating the finished embroidery pattern. When sewing an embroidery pattern using the sewing machine 1, the user selects a desired embroidery pattern from a plurality of embroidery patterns on the basis of a plurality of embroidery data stored in the flash memory 64. The embroidery data may be obtained from a storage device such as an external device that is connected via the communication I/F 67 or a memory card that is electrically connected to the sewing machine 1.

The embroidery pattern 5 is an embroidery pattern to be sewn with a single color thread, which represents an uppercase letter A. The left-right direction in FIG. 4 corresponds to the X direction in the embroidery coordinate system, and the up and down direction corresponds to the Y direction. The size of the embroidery pattern 5 is indicated by the size of the smallest rectangle 56 containing the embroidery pattern 5. In this example, the embroidery pattern 5 is associated with the marker 4. More specifically, with the embroidery pattern 5, the initial size and arrangement of the embroidery pattern 5 with respect to the marker 4 are determined as shown in FIG. 4. The initial size of the embroidery pattern 5 with respect to the marker 4 is determined such that the size of the embroidery pattern 5 in the Y direction is 1.7 times the size of the marker 4 in the Y direction. The initial arrangement of the embroidery pattern 5 with respect to the marker 4 is determined such that the center of the marker 4 is aligned with the center of the embroidery pattern 5. The initial size and arrangement of the embroidery pattern 5 with respect to the marker 4 may be different or the same for each embroidery pattern. The initial size and arrangement of the embroidery pattern 5 with respect to the marker 4 may also be able to be set by the user.

The sewing area storage area 70 stores the ID indicating the type of the embroidery frame 50 and the size of the sewing area with respect to the marker 4 in association with each other. The ID is a character string in which letters and numbers are combined. The left-right direction in FIG. 4 corresponds to the X direction in the embroidery coordinate system, and the up and down direction corresponds to the Y direction. The sewing area is a rectangular region that extends in the X direction and the Y direction. The sewing area storage area 70 also stores the position of the sewing area with respect to the embroidery frame 50. The flash memory 124 of the device 3 has the sewing area storage area 138, and stores the ID indicating the type of the embroidery frame 50 and the size of the sewing area with respect to the marker 4 in association with each other, similar to the sewing area storage area 70. The flash memory 124 also stores the initial arrangement of the sewing area with respect to the marker 4. The size and arrangement of the sewing area 54 with respect to the graphic pattern 48 of the marker 4 in the embroidery frame 50 with an ID of W001 differ from the size and arrangement of the sewing area 54 with respect to the graphic pattern 48 of the marker 4 in the embroidery frame 50 with an ID of W002. In this example, the size and arrangement of the sewing area with respect to the marker 4 differ for each type of embroidery frame 50.

[6. Outline of Embroidery Pattern Editing Processing]

The outline of embroidery pattern editing processing able to be performed by the sewing system 100 will now be described. With the sewing system 100, the arrangement of the embroidery pattern sewn by the sewing machine 1 can be edited by the device 3. When the embroidery pattern to be sewn and the type of the embroidery frame 50 to be used at the time of sewing are selected, the sewing machine 1 sends data indicating the selected embroidery pattern and data indicating an editable area to the device 3. The editable area is an area within which the embroidery pattern 5 indicated by the data received in step S1 (refer to FIG. 4) can be edited in the device 3. The editable area is an area of the same size and shape as the sewing area. The device 3 receives data indicating the embroidery pattern sent from the sewing machine 1. The user adheres the marker 4 to the sewing workpiece C (object) on which the embroidery pattern is to be sewn, and uses the device 3 to capture a real space that includes the marker 4 that will serve as a reference for the arrangement of the embroidery pattern. The device 3 detects the marker 4 from a real image in which of the real space is captured, and displays a pattern image 46 indicating the embroidery pattern on the basis of the received data, superimposed on an area image indicating the editable area with the detected marker 4 as the reference, on the displaying portion 135. The user edits the embroidery pattern while referring to the image displayed on the displaying portion 135. When the device 3 receives a command to end editing of the embroidery pattern, the device 3 sends editing data to the sewing machine 1 via the communication I/F 125. The editing data is data indicating the editing content of the embroidery pattern. When editing of the embroidery pattern in the device 3 is complete, the user causes the embroidery frame 50 that has been selected to be used to hold the sewing workpiece C to which the marker 4 has been adhered, without the marker 4 being peeled off. The user then attaches the embroidery frame 50 holding the sewing workpiece C to the sewing machine 1. The sewing machine 1 captures the sewing workpiece C that is held to the embroidery frame 50 and on which the marker 4 is arranged, and detects the marker 4 from the outputted image data. The sewing machine 1 corrects embroidery data (sewing data) of the embroidery pattern on the basis of the editing data received from the device 3 with the detected marker 4 as a reference. The sewing machine 1 sews the embroidery pattern in accordance with the corrected embroidery data.

[7. Processing Performed by Device 3]

The main processing of the device 3 will be described with reference to FIG. 5 to FIG. 9. In the main processing of the device 3, processing that edits the embroidery pattern 5 selected by the sewing machine 1 and confirming the editing content is performed using AR technology. In the main processing of the device 3, processing that sends the editing data to the sewing machine 1 is further performed. The main processing is performed when the user operates the device 3 and inputs a command to launch an application to perform the main processing. When the command is detected, the CPU 121 of the device 3 reads an embroidery pattern editing program for performing the main processing stored in the program storage area of the ROM 122 to the RAM 123. The CPU 121 performs the following steps according to commands included in the embroidery pattern editing program read to the RAM 123. Various parameters necessary for performing the main processing are stored in the flash memory 124. Various data obtained in the main processing is stored in the RAM 123 as appropriate. Hereinafter, in order to simplify the description, a case will be explained in which the embroidery pattern 5 to be sewn is selected and the embroidery frame 50 to be used when sewing the embroidery pattern 5 is selected, in the sewing machine 1 before the main processing starts.

Figure 5:
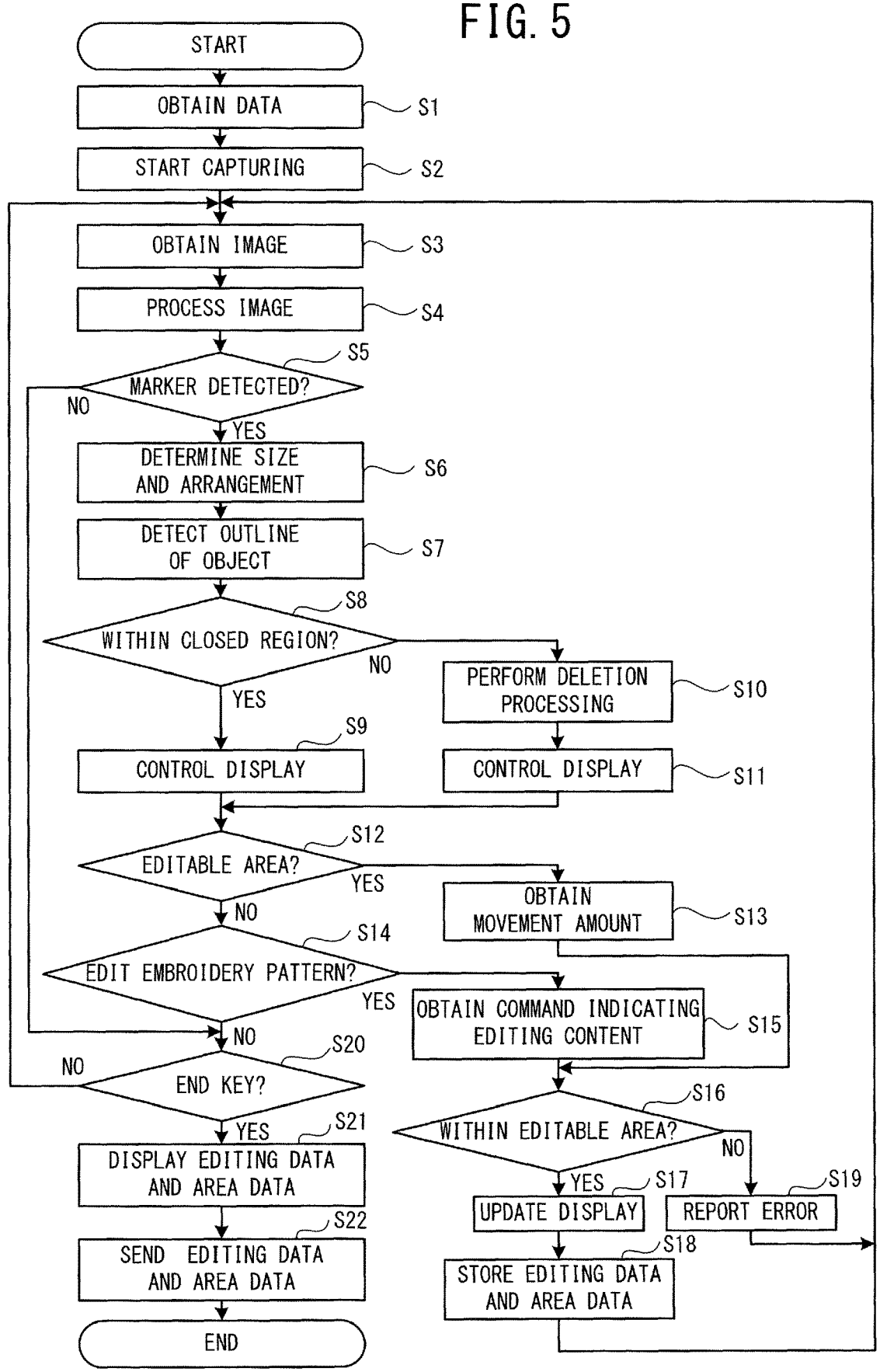
FIG. 5 is a flowchart of main processing performed by the embroidery pattern displaying device.

In the main processing illustrated in FIG. 5, the CPU 121 receives an ID of the embroidery frame 50 data indicating the embroidery pattern 5 associated with the marker 4 sent from the sewing machine 1, and data indicating the editable area (step S1). The data indicating the embroidery pattern 5 is pattern image data of the embroidery pattern 5 selected as the pattern to be sewn by the sewing machine 1. The data indicating the editable area is data indicating the editable area to be used in sewing the embroidery pattern. The ID of the embroidery frame 50 is information identifying the type of the embroidery frame 50. Data indicating the size and shape of the editable area may be obtained as the data indicating the editable area.

Figure 6:
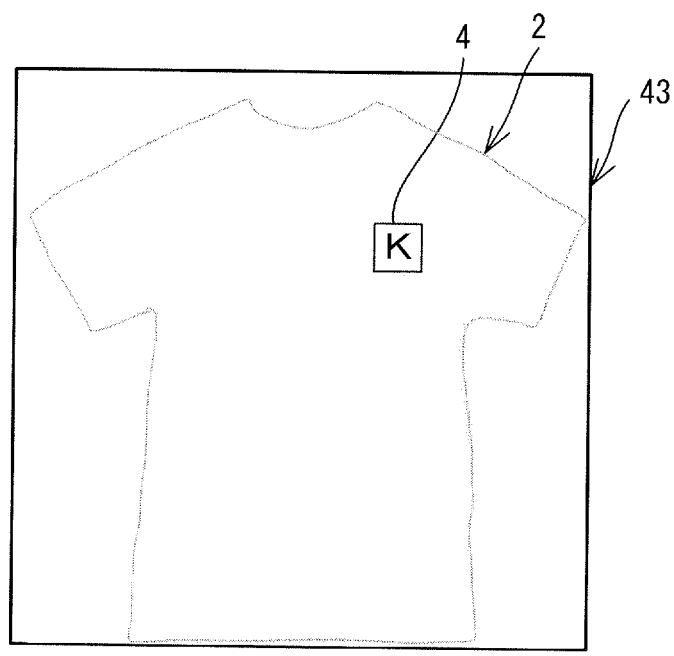
FIG. 6 is an explanatory view of a real image.

The CPU 121 outputs a command to the image sensor 134 to start capturing (step S2). The image sensor 134 starts processing that captures an image and outputs the image data, on the basis of the command from the CPU 121. The CPU 121 obtains a real image 43 indicated by the image data outputted from the image sensor 134 (step S3). The CPU 121 obtains the real image 43 in FIG. 6, for example. As illustrated in FIG. 6, the real image 43 is an image showing the manner in which the marker 4 is adhered to an area on the left chest portion of a white T-shirt 2.

The CPU 121 image-processes the real image 43 obtained in step S3 and detects the marker 4 from the real image 43 (step S4). The processing of step S4 is processing that detects the marker 4 associated with the embroidery pattern arranged in an augmented reality space from the real image captured by the image sensor 134. The marker 4 is detected and the coordinates are identified using a well-known method (see Japanese Laid-Open Patent Publication No. 2010-246885, for example). More specifically, feature points are extracted from the real image by publicly known image processing. The extracted feature points are compared to feature points extracted from the data indicating the marker 4 stored in the marker storage area 137 of the flash memory 124, and the feature points included in the marker 4 are detected. With regard to the feature points included in the marker 4, two-dimensional coordinates in an image coordinate system are calculated using the Hough transform process, for example. The feature points included in the marker 4 are, for example, end points and intersection points of the character pattern 47, and points at four corners of the graphic pattern 48. Then, the two-dimensional coordinates in the image coordinate system of the feature points included in the marker 4 are converted into three-dimensional coordinates in a world coordinate system. Since embroidery coordinate system and the world coordinate system are associated with each other, the coordinates in the embroidery coordinate system are calculated on the basis of the three-dimensional coordinates in the world coordinate system calculated by image processing.

The CPU 121 determines whether the marker 4 is detected by the image processing of step S4 (step S5). If the marker 4 is not detected (no at step S5), the CPU 121 then performs the processing of step S20 that will be described later. If the marker 4 is not detected (no at step S5), the CPU 121 may output a command to display the real image 43 obtained in step S3 to the displaying portion 135. The CPU 121 may output a command to display a message such as "Please capture marker." in addition to the real image 43.

If the marker 4 is detected (yes at step S5), the size and arrangement of the pattern image 46 is determined on the basis of the size and arrangement of the detected marker 4 in the real image 43 (step S6). The CPU 121 sets, on the basis of the pattern image data received in step S1, the initial size of the embroidery pattern 5 with respect to the marker 4 such that the size of the embroidery pattern 5 in the Y direction is 1.7 times the size of the marker 4 in the Y direction. The CPU 121 sets the initial arrangement of the embroidery pattern 5 with respect to the marker 4 such that the center of the marker 4 is aligned with the center of the embroidery pattern 5. The CPU 121 slants the embroidery pattern 5 according to the slant of the marker 4.

The CPU 121 detects an outline of an object (sewing workpiece C) on which the marker 4 is arranged, on the basis of the real image 43 obtained in step S3 (step S7). The outline of the object (sewing workpiece C) is obtained by providing the real image 43 to a publicly known filter such as a Prewitt filter or a Sobel filter, for example. Specifically, an outline 140 (refer to FIG. 7) of the T-shirt 2 is detected from the real image 43 by the processing of step S7. The CPU 121 may obtain the outline of the object on the basis of data rendered by the user using the touch panel 132. In step S7, if a portion of the object does not fit the real image, the outline of the portion of the object that does fit in the real image is detected. That is, there are cases where the outline of the object detected on the basis of the real image in step S7 does not match the outline of the actual object.

If the embroidery pattern 5 is arranged in the position determined in step S6, the CPU 121 determines whether the pattern image 46 indicating the embroidery pattern 5 fits within a closed region surrounded by the outline 140 detected in step S7 (step S8). The area bounded by the closed region including the marker 4 is an area where the sewing workpiece C is extended. The sewing machine 1 is able to sew the embroidery pattern on the sewing workpiece C that extends in a region smaller than the sewing area by adhering the sewing workpiece C to a fusible interfacing or the like. Therefore, in this example, the region where the embroidery pattern 5 can be arranged is a region in the editable area, and a portion of the embroidery pattern is permitted to be arranged outside the closed region (sewing workpiece C) if it is in the editable area. In this example, if the portion of the embroidery pattern is determined that the pattern image 46 does not fit within the closed region (no at step S8), the CPU 121 performs deletion processing that removes the region outside the outline 140 from the pattern image 46 (step S10), and outputs a command to display a screen in which the region outside the outline 140 generated in the deletion processing has been removed from the pattern image 46 on the displaying portion 135 (step S11).

Figure 7:
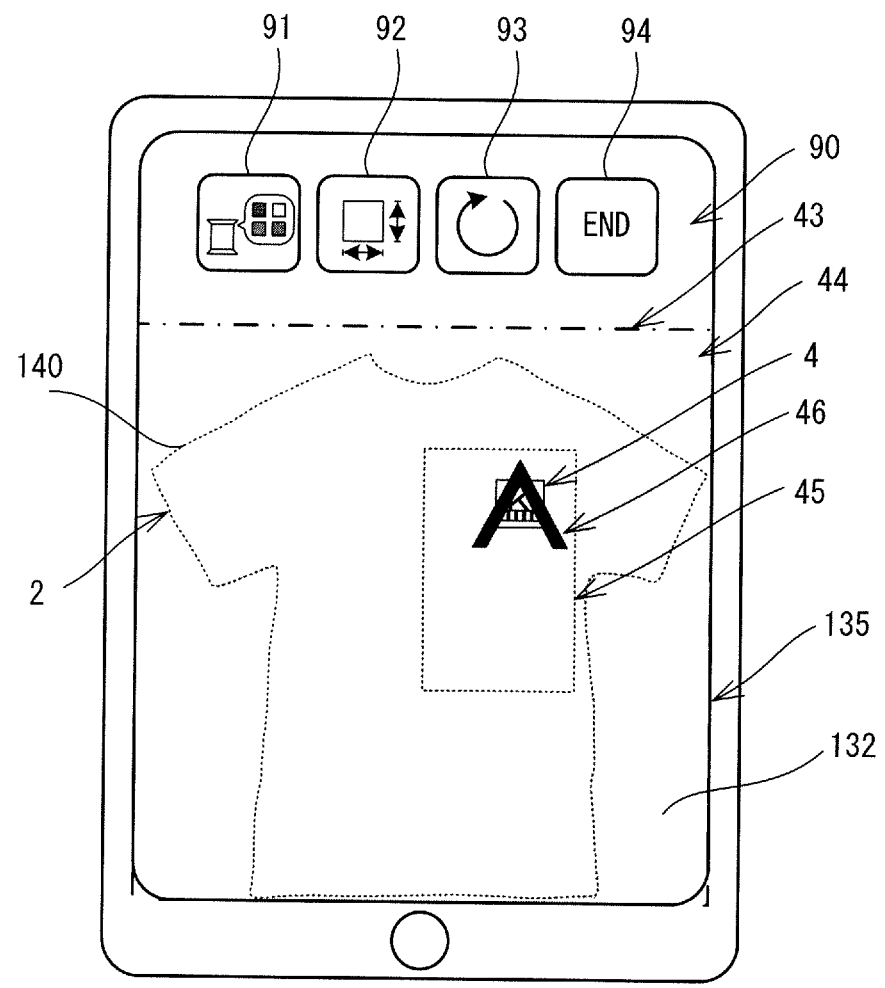
FIG. 7 is an explanatory view of the real image, a pattern image, and an area image displayed on a displaying portion of the embroidery pattern displaying device.

If the pattern image 46 fits within the closed region (yes at step S8), the CPU 121 outputs a command to display a pattern image 46 and an area image 45 superimposed on the real image 43 to the displaying portion 135 (step S9). The displaying portion 135 displays the pattern image 46 indicating embroidery pattern 5 associated with the marker 4, superimposed on the real image 43 with the marker 4 detected in step S4 as a reference, on the basis of a command from the CPU 121. The displaying portion 135 further displays the area image 45 indicating the editable area of the embroidery pattern 5, in addition to the pattern image 46, superimposed on the real image 43 with the detected marker 4 as a reference, on the basis of a command from the CPU 121. The displaying portion 135 displays a screen 44 and a screen 90 as illustrated in FIG. 7. The screen 44 includes the real image 43, the area image 45, and the pattern image 46. The real image 43 is an image obtained in step S3. The area image 45 is an image indicating the editable area of the embroidery pattern 5. The area image 45 indicates the editable area with a dotted rectangle. In the area image 45, the region inside the dotted line is transparent. The CPU 121 causes the area image 45 corresponding to the type of the embroidery frame 50 indicated by the ID of the embroidery frame 50 to be displayed superimposed on the real image 43. The CPU 121 displays the area image 45 corresponding to the ID of the embroidery frame 50 obtained in step S1 at the initial size and arrangement with respect to the marker 4. The pattern image 46 is displayed at the size and arrangement (position and angle) determined in step S6, on the basis of the pattern image data obtained in step S1. In the pattern image 46, the region where stitches are not formed is transparent.

The screen 90 is adjacent to the screen 44 and above the screen 44 in FIG. 7. The screen 90 includes input keys 91 to 94. The input key 91 is a key for inputting a color change command to change thread color of the embroidery pattern 5. When the input key 91 is selected, a color palette indicating thread colors that are available for the user is displayed, and the user is able to select the color of the embroidery pattern 5 from among the colors displayed in the color palette. With an embroidery pattern formed by stitches of a plurality of colors, the thread color may be changed for each partial pattern of each of the plurality of colors. The input key 92 is a key for inputting a command to change the size of the embroidery pattern 5. When the input key 92 is selected, an input field for inputting the size in the X direction and the Y direction of the embroidery pattern 5 is displayed, and the user is able to input the size of the embroidery pattern in the displayed input field.

The input key 93 is a key for inputting a command to rotate the embroidery pattern 5. When the input key 93 is selected, an input field for inputting the rotation angle of the embroidery pattern 5 is displayed, and the user is able to input the angle of the embroidery pattern in the displayed input field. It will be assumed that the rotation angle is defined such that the clockwise angle in the XY plane in the embroidery coordinate system is a positive angle. The input key 94 is a key for inputting a command to end the editing of the embroidery pattern 5 represented by the pattern image 46 displayed on the displaying portion 135. A command to change the position of the embroidery pattern 5 is input by selecting the position of the embroidery pattern 5 after the move while the pattern image 46 is selected. A command to change the position of the editable area is inputted by selecting the position of the editable area after the move while the area image 45 is selected. In this example, the position of the editable area with respect to the marker 4 can be changed within a range where the entire marker 4 fits within the editable area.

Figure 8:
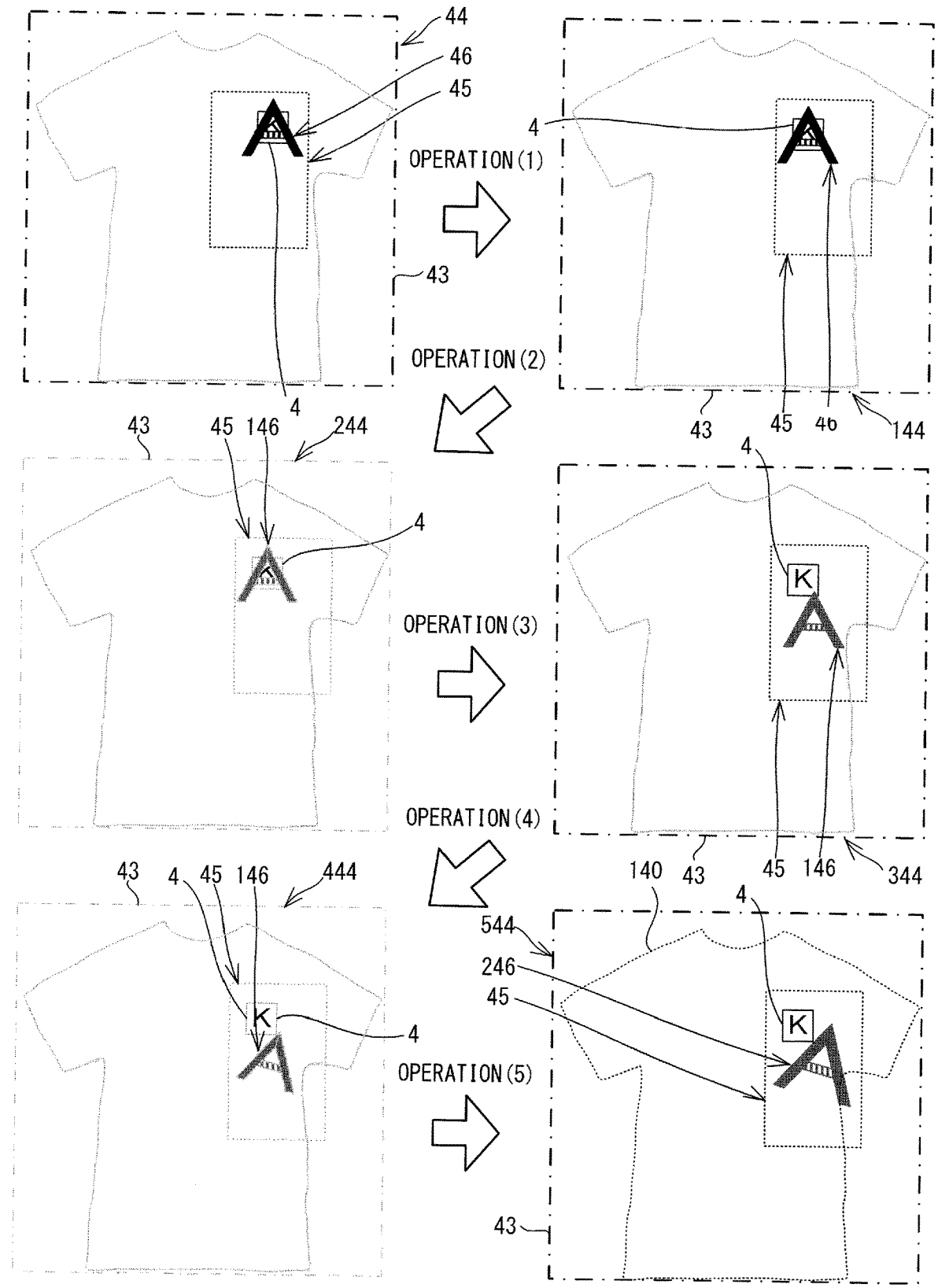
FIG. 8 is an explanatory view of screens displayed on the displaying portion according to editing by operations (1) to (5) and editing content.
Figure 9:
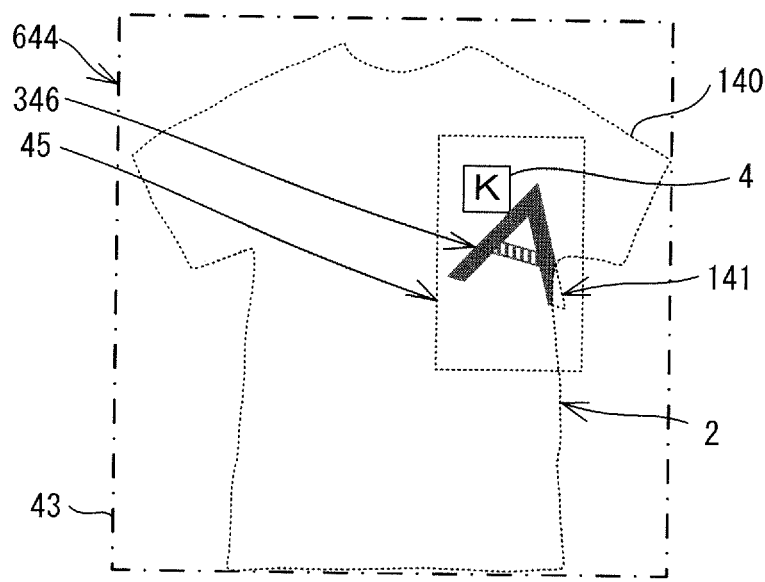
FIG. 9 is an explanatory view of a screen displayed on the displaying portion of the embroidery pattern displaying device.

The CPU 121 determines whether a command to move the editable area has been input (step S12). The CPU 121 determines that the command to move the editable area has been input (yes at step S12) when the position of the editable area after the move has been selected within a range where the entire marker 4 fits within the editable area, while the area image 45 is selected. That is, the CPU 121 receives a change of the display position of the area image 45 within a range where the marker 4 is arranged within the editable area indicated by the area image 45. When an operation (1) in FIG. 8, in which a command to move the editable area from the state in screen 44 to the right in FIG. 8, is performed (yes at step S12), the CPU 121 obtains the movement amount of the editable area (step S13). The CPU 121 calculates the movement amount from the difference between the current position of the editable area and the selected position of the editable area after the move. The movement amount may be indicated in a direction. The direction indicating the movement amount may be a direction based on the upper, lower, left, and right directions of the marker 4. The direction indicating the movement amount may be coordinates from a representative point (for example, the center point) of the marker 4. The movement amount may be the current coordinates of the editable area calculated from the real image and the coordinates after the move. When moving the editable area by the movement amount obtained in step S13, the CPU 121 determines whether the embroidery pattern 5 will fit within the editable area (step S16). If the embroidery pattern 5 will fit within the editable area (yes at step S16), the CPU 121 outputs to the displaying portion 135 a command to display a screen that reflects the change of the position of the editable area with respect to the marker 4, on the basis of the movement amount obtained in step S13 (step S17). Specifically, the CPU 121 outputs to the displaying portion 135 a command to display a screen 144 on the displaying portion 135 in response to the execution of operation (1), for example. The screen 144 includes the real image 43, the area image 45, and the pattern image 46. The area image 45 is arranged to the right compared with the area image 45 of the screen 44, in accordance with the movement amount obtained in step S13.

The CPU 121 changes area data indicating the position of the editable area with respect to the marker 4 on the basis of the movement amount obtained in step S13, and stores the changed area data in the flash memory 124 (step S18). The CPU 121 then returns the processing to step S3. If the embroidery pattern 5 does not fit within the editable area (no at step S16), the CPU 121 reports an error (step S19). The CPU 121 outputs to the displaying portion 135 a command to display "Editing in which embroidery pattern protrudes from editable area is invalid." as an error message, for example. The CPU 121 discards the movement amount obtained in step S13 and returns the processing to step S3 without reflecting the movement of the editable area.

If a command to move the editable area has not been input (no at step S12), the CPU 121 determines whether a command to edit the embroidery pattern 5 has been received (step S14). In step S14, the CPU 121 receives editing with respect to the embroidery pattern 5 via the touch panel 132. When a command to change the position of the embroidery pattern 5 with respect to the marker 4 has been input, and one of the input keys 91 to 93 has been selected and an edit command has been input, the CPU 121 determines that a command to edit the embroidery pattern 5 has been obtained. If a command to edit the embroidery pattern 5 is received (yes at step S14), the CPU 121 obtains a command to display the editing content (step S15).

When the input key 91 is selected and an operation (2) in which the color red is selected from the color palette is executed while the screen 144 in FIG. 8 is displayed (yes at step S14), the CPU 121 obtains a command to change the thread color of the embroidery pattern 5 to red (step S15). When a pattern image 146 is selected and an operation (3) in which the position of the embroidery pattern 5 after the move is selected is executed while a screen 244 in FIG. 8 is displayed (yes at step S14), the CPU 121 obtains a command to move the embroidery pattern 5 from the current position to the selected position (step S15). In this case, the CPU 121 may obtain the movement amount of the embroidery pattern 5, similar to the processing of step S13. When the input key 93 is selected and an operation (4) in which 15 degrees is input for the rotation angle is executed while a screen 344 in FIG. 8 is displayed (yes at step S14), the CPU 121 obtains a command to set the rotation angle of the embroidery pattern 5 to 15 degrees (step S15). When the input key 92 is selected and an operation (5) in which the embroidery pattern 5 is enlarged to 1.7 times the size is executed while a screen 444 in FIG. 8 is displayed (yes at step S14), the CPU 121 obtains a command to enlarge the embroidery pattern 5 to 1.7 times (step S15).

When the pattern image 146 is changed according to the editing content received in step S14, the CPU 121 determines whether the pattern image 146 will fit within the editable area indicated by the area image 45 displayed on the displaying portion 135 (step S16). If the pattern image 146 will not fit within the editable area indicated by the area image (no at step S16), the CPU 121 reports an error (step S19). The CPU 121 outputs to the displaying portion 135 a command to display "Editing in which embroidery pattern protrudes from editable area is invalid." as an error message, for example. The CPU 121 voids the editing content obtained in step S15 and returns the processing to step S3. When editing with respect to the embroidery pattern 5 has been received (yes at step S14), only valid editing content will be reflected in the pattern image 146 being displayed on the displaying portion 135. The CPU 121 may perform processing that enables editing of the embroidery pattern 5 within a range where the pattern image 146 fits within the editable area in step S19. For example, when a command, as an editing content, to change the position of the embroidery pattern 5 is received, the CPU 21 may perform processing that enables a change of the position of the embroidery pattern 5 within the range where the pattern image 146 representing the embroidery pattern 5 fits within the editable area. That is, the CPU 21 may enable only the editing content within the range in which the pattern image 146 representing the embroidery pattern 5 fits within the editable area. Therefore, the pattern image 146 can only move in the editable area.

If it is determined that the embroidery pattern 5 will fit within the editable area (yes at step S16), the CPU 121 outputs to the displaying portion 135 a command to update the screen on the basis of the editing content obtained in step S15 (step S17). In step S17, the editing content received in step S14 is reflected in the pattern image 146 being displayed on the displaying portion 135. If the operation (2) described above is executed while the screen 144 in FIG. 8 is displayed (yes at step S14), the displaying portion 135 displays the screen 244 on the basis of a command from the CPU 121 (step S17). The screen 244 includes the real image 43, the area image 45, and the pattern image 146. The pattern image 146 is an image that represents the embroidery pattern 5 in which the thread color, i.e., the color of the embroidery pattern 5, has been changed to red in step S15.

When the operation (3) described above is executed while the screen 244 in FIG. 8 is displayed (yes at step S14), the displaying portion 135 displays the screen 344 on the basis of a command from the CPU 121 (step S17). The screen 344 includes the real image 43, the area image 45, and the pattern image 146. The pattern image 146 of the screen 344 is arranged to the lower right by the movement amount obtained in step S15, compared to the pattern image 146 of the screen 244.

When the operation (4) described above is executed while the screen 344 in FIG. 8 is displayed (yes at step S14), the displaying portion 135 displays a screen 444 on the basis of a command from the CPU 121 (step S17). The screen 444 includes the real image 43, the area image 45, and the pattern image 146. The pattern image 146 of the screen 444 is rotated by the rotation amount obtained in step S15, compared to the pattern image 146 of the screen 344.

When the operation (5) described above is executed while the screen 444 in FIG. 8 is displayed (yes at step S14), the displaying portion 135 displays a screen 544 on the basis of a command from the CPU 121 (step S7). The screen 544 includes the real image 43, the area image 45, and a pattern image 246. The pattern image 246 on the screen 544 is an image in which the pattern image 146 on the screen 444 has been enlarged by an enlargement factor obtained in step S15.

The CPU 121 changes editing data indicating the size and arrangement of the embroidery pattern 5 with respect to the marker 4 as well as the color of the embroidery pattern 5, on the basis of the editing content obtained in step S15, and stores the changed editing data in the flash memory 124 (step S18). The editing data when the operation (2) described above is executed is data that changes the thread color to red. The editing data when the operation (3) described above is executed is data indicating the movement amount of the embroidery pattern 5 with respect to the marker 4. The editing data when the operation (4) described above is executed is the rotation amount of the embroidery pattern 5 with respect to the marker 4. The editing data when the operation (5) described above is executed is the enlargement factor of the embroidery pattern 5. After the processing of step S18, the CPU 121 then returns the processing to step S3.

In step S6 after the processing has returned to step S3, the CPU 121 determines the size and arrangement of the pattern image 246 with respect to the marker 4, as well as the arrangement of the area image, on the basis of the editing data and the area data stored in the flash memory 124 in step S18 (step S6). In the screen 544, when the pattern image 246 is displayed superimposed on the real image 43 at the size and arrangement determined in step S6, the pattern image 246 will not be arranged in the closed region surrounded by the outline 140 detected in step S7 (no at step S8). In such a case, the CPU 121 outputs to the displaying portion 135 a command to display an image in which the portion outside the closed region surrounded by the outline 140 detected in step S7 has been deleted from the pattern image (step S11). The displaying portion 135 displays a screen 644 illustrated in FIG. 9 in the portion where the screen 44 in FIG. 7 is displayed, in response to a command from the CPU 121. The screen 644 includes the real image 43, the area image 45, and a pattern image 346. The pattern image 346 is an image in which a portion 141 outside the closed region surrounded by the outline 140 detected in step S7 has been deleted from the pattern image 246 in the screen 544. After step S11, the CPU 121 performs the same processing of step S12 described above.

If a command to edit the embroidery pattern 5 is not obtained (no at step S14), the CPU 121 determines whether the input key 94 is selected (step S20). If the input key 94 is not selected (no at step S20), the CPU 121 returns the processing to step S3. If the input key 94 is selected (yes at step S20), the CPU 121 performs processing that displays editing data indicating the editing content obtained in step S15 (step S21). Specifically, the CPU 121 outputs to the displaying portion 135 a command to display a screen indicating the editing data and the area data stored in step S18 (step S21). When the operations (1) to (5) are executed, the CPU 121 outputs to the displaying portion 135 a command to display the color, movement amount, rotation amount, and enlargement factor of the embroidery pattern 5 as the editing data. That is, the editing data includes position information and size information. The position information is information indicating the position of the embroidery pattern 5 with the position of the marker 4 as a reference. The size information is information identifying the size of the embroidery pattern 5. The CPU 121 displays the movement amount of the sewing area with respect to the marker 4 as area data. The CPU 121 sends the editing data and the area data to the sewing machine 1 via the communication I/F 125 (step S22). Then the CPU 121 ends the main processing. The CPU 121 may end the main processing when notification that reception is complete is received from the sewing machine 1, with respect to the data sent in step S22.

[8. Processing Performed by Sewing Machine 1]

The main processing performed by the sewing machine 1 will be described with reference to FIG. 10. The main processing of the sewing machine 1 is performed when a start command is input by a user after the embroidery pattern to be sewn and the embroidery frame 50 to be used have been selected. In the main processing, processing that arranges the embroidery pattern with respect to the arrangement of the marker 4 captured by the sewing machine 1, in accordance with the content edited by the device 3, and sewing the embroidery pattern is performed. When a command is detected, the CPU 61 of the sewing machine 1 reads a program for performing the main processing stored in the program storage area of the ROM 62 to the RAM 63. The CPU 61 performs the following steps according to commands included in the program read to the RAM 63. Various parameters necessary for performing the main processing are stored in the flash memory 64. Various data obtained throughout the main processing is stored in the RAM 63 as appropriate. Hereinafter, in order to simplify the description, a case will be described in which the embroidery pattern 5 to be sewn is selected and the embroidery frame 50 to be used when sewing the embroidery pattern 5 is selected in the sewing machine 1, and the embroidery pattern 5 is edited in accordance with the main processing of the device 3, in the device 3, before the main processing starts.

Figure 10:
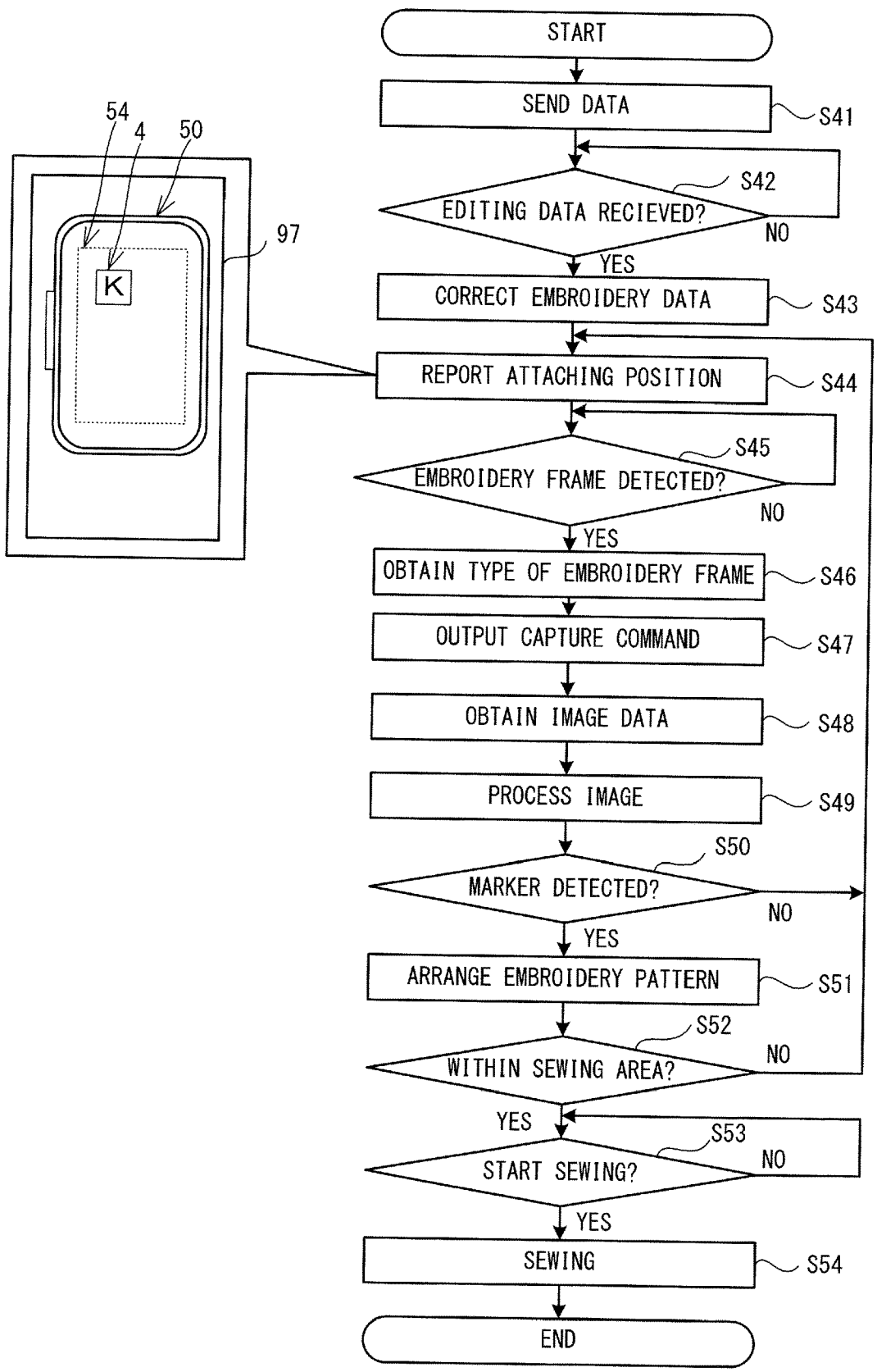
FIG. 10 is a flowchart of main processing performed by the sewing machine.

As illustrated in FIG. 10, the CPU 61 of the sewing machine 1 sends the data indicating the embroidery pattern to be sewn and data indicating the editable area to the device 3 via the communication I/F 67 (step S41). The data indicating the editable area is data indicating the type of the embroidery frame 50. In step S41, the pattern image data and the ID of the embroidery frame 50 are sent to the device 3. The CPU 61 determines whether editing data has been received from the device 3 (step S42). The editing data of step S42 is editing data to be sent from the device 3 in step S22 of FIG. 5. If the editing data has not been received (no at step S42), the CPU 61 waits until the editing data is received. If the editing data has been received (yes at step S42), the CPU 61 corrects embroidery data of the embroidery pattern to be sewn, on the basis of the editing data received in step S42 (step S43). Specifically, the color thread data of the sewing data is changed to red on the basis of the editing data. The coordinate data of the sewing data is corrected on the basis of the rotation amount and the enlargement factor of the embroidery pattern indicated by the editing data.

The CPU 61 reports the attaching position indicating the marker 4 with respect to the selected embroidery frame 50 to be used (step S44). The CPU 61 determines the attaching position on the basis of the position of the editable area with respect to the marker 4 indicated by the area data received in step S42, and the position of the sewing area 54 with respect to the embroidery frame 50 stored in the sewing area storage area 70. The CPU 61 displays a screen 97 in FIG. 10, and displays the position of the marker 4 with respect to the embroidery frame 50, on the LCD 15, for example. The sewing area 54 may be displayed on the screen 97, but it is also acceptable not to display the sewing area 54 on the screen 97. The position of the sewing area 54 with respect to the marker 4 on the screen 97 is the same as the position of the editable area with respect to the marker 4 on the screen 644 in FIG. 9. The user causes the embroidery frame 50 to hold the T-shirt 2 while referring to the LCD 15. The marker 4 captured by the device 3 when editing the embroidery pattern 5 is affixed to the T-shirt 2 without being peeled off. The user attaches the embroidery frame 50 holding the T-shirt 2 to the sewing machine 1. The CPU 61 determines whether the embroidery frame 50 is attached on the basis of an outputted signal from the detector 36 (step S45). If the embroidery frame 50 is not detected (no at step S45), the CPU 61 waits until the embroidery frame 50 is detected.

If the embroidery frame 50 is detected (yes at step S45), the CPU 61 obtains the type of embroidery frame and identifies the ID of the embroidery frame 50 on the basis of an outputted signal from the detector 36 (step S46). The CPU 61 may output to the displaying portion 135 a command to display an error message if the ID of the embroidery frame 50 identified in step S46 is different from the ID of the embroidery frame 50 sent in step S41.

The CPU 61 outputs a capture command to the image sensor 35 (step S47). The image sensor 35 starts processing that captures an image within a capture area and outputs image data to the CPU 61 on the basis of a command from the CPU 61. The CPU 61 obtains the image data outputted from the image sensor 35 (step S48). The CPU 61 may obtain image data indicating the entire sewing area, or may obtain image data indicating a portion, within the sewing area 54, that includes the attaching position of the marker 4 with respect to the sewing area 54 reported in step S44. The CPU 61 image-processes the image data obtained in step S48 and detects the marker 4 included in the image by processing similar to the processing of step S4 in FIG. 5 (step S49).

The CPU 61 determines whether the marker 4 is detected with step S49 (step S50). If the marker 4 is not detected (no at step S50), the CPU 61 returns the processing to step S44. The CPU 61 may display an error message such as "Marker not detected. Please reattach sewing workpiece C." If the marker 4 is detected (yes at step S50), the CPU 61 arranges the embroidery pattern 5 associated with the marker 4, in accordance with the marker 4 (step S51). The CPU 61 sets the position of the embroidery pattern 5 with respect to the marker 4 to a position moved by the movement amount included in the editing data from the initial position. The CPU 61 slants the embroidery pattern 5 according to the slant of the marker 4.

When the embroidery pattern is arranged according to the marker 4, the CPU 61 determines whether the embroidery pattern fits within the sewing area 54 (step S52). The sewing area 54 is identified on the basis of the type of the embroidery frame 50 obtained in step S46, and the correspondence between the type of the embroidery frame 50 stored in the sewing area storage area 70 and the sewing area. If the embroidery pattern 5 does not fit within the sewing area 54 (no at step S52), the CPU 61 returns the processing to step S44. If the embroidery pattern 5 fits within the sewing area 54 (yes at step S52), the CPU 61 determines whether a command to start sewing has been input by the start/stop switch 29 being pressed down (step S53). If the command to start sewing has not been input (no at step S53), the CPU 61 waits until the command to start sewing is input. If the command to start sewing has been input (yes at step S53), the CPU 61 sews the embroidery pattern in accordance with the arrangement set in step S51 (step S54). More specifically, the CPU 61 drives the X-axis motor 83 and the Y-axis motor 84 (refer to FIG. 3) according to the embroidery data corrected in step S43 and moves the embroidery frame 50. The CPU 61 sews the embroidery pattern 5 onto the sewing workpiece C (T-shirt 2) held by the embroidery frame 50, by driving the needle bar up-and-down movement mechanism 34 by the sewing machine motor 81 in conjunction with the movement of the embroidery frame 50 so as to move the needle bar 6 to which the sewing needle 7 is attached up and down. When the sewing of the embroidery pattern 5 is finished, the CPU 61 ends the main processing as described above. When the embroidery pattern 5 is sewn in accordance with the editing content of the screen 644 illustrated in FIG. 9, the embroidery pattern 5 may be a pattern in which the portion 141 has been removed, or a pattern that includes the portion 141. Specifically, the sewing workpiece C of a specific example is the T-shirt 2, and the position of an end portion (a portion of a hoop) can be changed so that the entire embroidery pattern 5 can be sewn when the sewing workpiece C is held in the embroidery frame 50. The sewing machine 1 or the device 3 may allow the user to select whether to sew the entire embroidery pattern 5.

The device 3 detects the marker 4 associated with the embroidery pattern arranged within the augmented reality space, from the real image 43 that is an image of the real space captured by the image sensor 134 (step S4). When the marker 4 is detected from the real image 43 (yes at step S5), the pattern image 46 indicating the embroidery pattern 5 associated with the detected marker 4 is displayed superimposed on the real image 43 with the detected marker 4 as a reference, on the displaying portion 135 (step S9). The editing content with respect to the embroidery pattern 5 is received via the touch panel 132 (step S12 and step S14). When the editing content with respect to the embroidery pattern has been received (yes at step S12 and yes at step S14), the received editing content is reflected in the pattern image 46 displayed on the displaying portion 135 (step S17).

The user is then able to confirm the finished image of the embroidery pattern when the embroidery pattern 5 has been arranged with respect to the sewing workpiece C and the embroidery pattern 5 has been edited, by referring to the displaying portion 135. The user can imagine the finished embroidery pattern 5 by referring to the real image 43 and the pattern image 46. The user can edit the embroidery pattern 5 while confirming the finished embroidery pattern 5.

The device 3 outputs the editing data indicating the received editing content with respect to the embroidery pattern 5 (step S22). The user can sew the embroidery pattern 5 with the sewing machine 1 according to the editing content received by the device 3, on the basis of the outputted editing data. The device 3 outputs the editing data to the sewing machine 1 via the communication I/F 125 provided in the device 3, so the user is saved the trouble of inputting the editing data to the sewing machine 1. It is thus possible to avoid erroneous entry of the editing data by the user, so the user can sew the embroidery pattern 5 with the sewing machine 1 according to the editing content in the device 3.

The device 3 receives data indicating the embroidery pattern 5 associated with the marker 4 from the sewing machine 1 via the communication I/F 125 (step S1). The device 3 causes the pattern image 46 to be displayed on the displaying portion 135 on the basis of the data received from the sewing machine 1 (step S9). The device 3 does not need to store the data indicating the embroidery pattern 5.

The editing data includes the position information indicating the position of the embroidery pattern 5 with the position of the marker 4 as a reference. The user can change the position of the embroidery pattern 5 with the position of the marker 4 as a reference while confirming the finished embroidery pattern 5. The editing data includes the size information identifying the size of the embroidery pattern 5. The user can change the size of the embroidery pattern 5 while confirming the finished embroidery pattern 5.

When the editing content with respect to the embroidery pattern 5 is received, the device 3 displays the received editing content on the displaying portion 135 (step S21). The user can confirm the received editing content by referring to the displaying portion 135. The user can sew the embroidery pattern 5 with the sewing machine 1 according to the editing content in the device 3, by inputting the editing content displayed on the displaying portion 135 to the sewing machine 1.

When the marker 4 is detected from the real image 43 (yes at step S5), the device 3 displays the area image 45 indicating the editable area of the embroidery pattern 5, in addition to the pattern image 46, superimposed on the real image 43 with the detected marker 4 as a reference. The user can determine, with the displaying portion 135, whether the embroidery pattern 5 is arranged within the editable area. It is possible to suppress the embroidery pattern 5 from being edited in a range beyond the editable area. The user can thus determine whether it is possible to sew the embroidery pattern 5 with the sewing machine 1 according to the editing content in the device 3.

The device 3 identifies at least one of the type and the size of the embroidery frame 50 from the sewing machine 1 via the communication I/F 125 (step S1). The device 3 displays the area image 45 corresponding to the at least one of the identified type and the identified size of embroidery frame 50, in addition to the pattern image 46, superimposed on the real image 43. The device 3 can display the area image 45 corresponding to the type or size of the embroidery frame 50 attached to the sewing machine 1, superimposed on the real image 43. The user can grasp the editable area according to the type or size of the embroidery frame 50 to be attached to the sewing machine 1, without having to input the type or size of the embroidery frame 50 to the device 3.

When the received editing content is reflected in the pattern image 146, the device 3 determines whether the reflected pattern image 146 exceeds the editable area indicated by the area image 45 displayed on the displaying portion 135 (step S8). In response to determining that the pattern image 146 fits within the editable area, an error is displayed on the displaying portion 135 (step S19) or editing of the embroidery pattern 5 within a range where the pattern image 146 is within the editable area is enabled. When the editing content with respect to the embroidery pattern 5 is received, enabled editing content is reflected in the pattern image 146 displayed on the displaying portion 135 (step S18). The device 3 is able to reliably suppress the embroidery pattern 5 from being edited in a range beyond the editable area.

The change of the display position of the area image 45 is received within a range where the marker 4 is arranged within the editable area indicated by the area image 45 (step S12). When the change of the display position of the area image 45 is received, the device 3 reflects the change of the display position (step S17). The user can change the editable area with respect to the marker 4 within a range in which the marker 4 is arranged within the editable area. The device 3 outputs area data indicating the position of the area image 45 with respect to the position of the marker 4 (step S22). The user can obtain the position of the area image 45 with respect to the position of the marker 4.

The device 3 detects the outline 140 of the object on which the marker 4 is arranged from the real image 43 (step S7). The device 3 determines whether the pattern image 246 fits within the closed region surrounded by the detected outline 140 (step S8). In response to determining that the pattern image 246 does not fit within the closed region, the region outside the closed region of the outline 140 is excluded from the pattern image 46 and this is reflected in the pattern image 346 displayed on the displaying portion 135 (step S11). The user can appropriately grasp the finished embroidery pattern 5 when a portion of the embroidery pattern 5 is arranged beyond the outline 140 of the object.

The embroidery pattern editing program and the embroidery pattern displaying device of the present disclosure are not limited to the embodiment described above. Various modifications may be made without departing from the scope of the present disclosure. For example, modifications (A) to (C) below may be made as appropriate.

(A) The device 3 need only include the image sensor 134, the displaying portion 135, the touch panel 132, and the CPU 121, and the configuration of the device may be modified as appropriate. Each of the image sensor 134, the displaying portion 135, and the touch panel 132 may be changed, as appropriate, to publicly known technology. For example, the touch panel 132 may be the operating switch 131. For example, the communication I/F 125 may be omitted from the device 3. The device 3 may be a mobile terminal such as a smartphone provided with a communication portion, or the device 3 may be a personal computer. The sewing machine 1 need only be able to sew the embroidery pattern 5, and the configuration of the sewing machine 1 may be modified as appropriate. The sewing machine 1 may be an industrial sewing machine and a multi-needle sewing machine. The movement mechanism 40 that is the moving portion of the sewing machine 1 need only be able to move the sewing workpiece C in a first direction relative to the image sensor 134, and a second direction intersecting the first direction. The moving portion may be a feed dog capable of moving the sewing workpiece C in the front-rear direction and the left-right direction, for example. The moving direction (first direction and second direction) of the sewing workpiece C by the moving portion may be modified as appropriate. The processing performed by the sewing machine 1 may be modified as appropriate.

(B) The embroidery pattern editing program that includes the command for performing the main processing (refer to FIG. 5) of the device 3 need only be stored in a storage device of the device 3 until the CPU 121 executes the program. Therefore, each of the program acquisition method, the program acquisition path, and the device that stores the program may be modified as appropriate. The program executed by the CPU 121 may be received from another device via a cable or wireless communication and stored in a storage device such as flash memory. The other device includes a PC and a server connected via a network, for example.

(C) The steps of the main processing (refer to FIG. 5) of the device 3 are not limited to the example in which the steps of the main processing are performed by the CPU 121. A portion or all of the steps may be performed by another electronic device (for example, ASIC). The steps of the main processing may be distribution-processed by a plurality of electronic devices (for example, a plurality of CPUs). The order of the steps of the main processing can be changed as necessary, and steps of the main processing can be omitted and added as necessary. A mode in which an operating system (OS) or the like that operates on the device 3 performs a portion or all of the main processing on the basis of a command from the CPU 121 is also included in the scope of the present disclosure. For example, modifications (C-1) to (C-6) below may be made, as appropriate, to the main processing.

(C-1) The type of data indicating the embroidery pattern 5 obtained in step S and the method of obtainment may be modified as appropriate. For example, the device 3 may store the embroidery data in the flash memory 124 or the like. In this case, the CPU 121 may obtain the ID of the embroidery pattern 5 from the sewing machine 1 as the data indicating the embroidery pattern 5. There is no need for the sewing machine 1 to be started at the time of starting the main processing of the device 3. The CPU 121 may obtain the sewing data of the embroidery pattern 5 as the data indicating the embroidery pattern 5. In this case, the CPU 121 may generate the pattern image data on the basis of the sewing data.

The CPU 121 may obtain the data indicating the embroidery pattern 5 via a communication portion or via a storage device such as a memory card. The CPU 121 may obtain the ID and the like of the embroidery pattern 5 input by the user as the data indicating the embroidery pattern 5.

(C-2) The processing that displays the area image indicating the editable area according to the arrangement of the marker 4 in the real image may be omitted as appropriate. If the processing that displays the area image is omitted, the device 3 does not need to send information identifying the type of the embroidery frame 50. In a case where the processing that displays the area image is performed, the CPU 121 may obtain data indicating the editable area by obtaining area image data indicating the area image. The CPU 121 may obtain the data indicating the editable area by obtaining information identifying the size of the editable area. In the CPU 121, the method for obtaining the data indicating the editable area may be modified as appropriate. The CPU 121 may obtain the ID and the like of the embroidery frame 50 input by the user as the data indicating the editable area. The CPU 121 does not have to receive a command to change the position of the editable area with respect to the marker 4 in a real image. The device 3 does not need to store the initial arrangement of the editable area with respect to the marker 4 for each type of embroidery frame 50. In this case, the device 3 may match up a representative point of the marker 4 and a representative point of the editable area regardless of the type of the embroidery frame 50, for example. The representative point in this example refers to a center point, a vertex, an intersection point, or a bending point or the like, for example.

In this example, an area of the same size and shape as the sewing area set according to the type of the embroidery frame 50 is set as the editable area, but the present disclosure is not limited to this. For example, a sewing area common to a plurality of types of embroidery patterns may be set as the editable area. In this way, the editable area can be set without identifying the type of the embroidery frame 50. The editable area may be a different size and shape than an area that is the same size and shape as the sewing area.

(C-3) The editable item of the embroidery pattern 5 in the device 3 may be modified as appropriate. For example, the CPU 121 may be capable of editing one of the position, angle, and size of the embroidery pattern with respect to marker 4. The CPU 121 does not have to receive a change of thread color. The editing data may be changed according to the content of editing the embroidery pattern. The editing data does not have to include position information. The editing data does not have to include size information. The device 3 may correct the sewing data according to the editing content, and may send the sewing data after the correction to the sewing machine 1 as the editing data in step S22. The method of inputting the editing content of the embroidery pattern may be modified as appropriate.

(C-4) The method of outputting the editing data and the area data may be modified as appropriate, and the processing that outputs at least one of the editing data and the area data may be omitted as necessary. When the device 3 includes a speaker, at least one of the editing data and the area data may be audio output via the speaker. For example, the CPU 121 may omit the processing of step S22. In this case, the user can sew the embroidery pattern onto the sewing workpiece C according to the editing content in the device 3, by inputting the editing data and the area data displayed on the displaying portion 135 in step S21 to the sewing machine 1.

(C-5) The device 3 may be capable of identifying each of a plurality of markers. In this case, the device 3 may store different embroidery patterns associated with each marker, and the CPU 121 may identify an embroidery pattern to be sewn, on the basis of the type of marker detected. In this case, the device 3 may store the type of marker and the pattern image data of the embroidery pattern in association with each other, and may display the pattern image on the basis of the pattern image data corresponding to the type of marker. In this way, the device 3 does not need to obtain data for displaying the pattern image from the sewing machine 1. When the device 3 stores the pattern image data of the embroidery pattern, selection of the embroidery pattern to be sewn may be performed by the device 3.

(C-6) The CPU 121 may omit the processing of step S7, step S8, step S10, and step S11. The CPU 121 may receive movement within the editable area in the closed region surrounded by the outline detected in step S7. The device 3 may be capable of performing the correction of the embroidery data performed by the sewing machine 1 in step S43. The CPU 121 may omit the processing of step S19. The CPU 121 may perform processing that enables editing of the embroidery pattern within a range where the embroidery image indicating the embroidery pattern is within the editable area.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions that, when executed, cause a processor of an embroidery pattern displaying device provided with a capturing portion and a displaying portion to perform steps comprising:
   detecting a marker associated with an embroidery pattern to be arranged within the displaying portion as a pattern image, from a real image that is an image of a real-world space captured by the capturing portion;
   determining, when the marker is detected from the real image, a size of the pattern image based on a size of the detected marker in the real image, the pattern image indicating the embroidery pattern associated with the detected marker; and
   displaying, when the marker is detected from the real image, the pattern image having the determined size superimposed on the real image with the detected marker as a reference, on the displaying portion, a relative position of the pattern image being predetermined with respect to a position of the marker, the pattern image being automatically aligned with the marker in the relative position of the pattern image.

2. The non-transitory computer-readable medium according to claim 1, wherein the computer-readable instructions further cause the processor to perform steps comprising:
   receiving a predetermined input via an input portion; and
   reflecting, when the predetermined input is received, the received predetermined input in the pattern image displayed on the displaying portion, the received predetermined input including changing a size of the pattern image or changing a position of the pattern image, on the basis of the detected marker as a reference.

3. The non-transitory computer-readable medium according to claim 2, wherein:
the receiving the predetermined input includes receiving an input of an editing content with respect to the embroidery pattern, and
the reflecting step includes reflecting, when the input of the editing content with respect to the embroidery pattern, the received editing content in the embroidery pattern displayed on the displaying portion, the received editing content including changing a size of the embroidery pattern or arrangement of the embroidery pattern.

4. The non-transitory computer-readable medium according to claim 3, wherein the computer-readable instructions further cause the processor to perform a step comprising:
outputting editing data indicating the received editing content.

5. The non-transitory computer-readable medium according to claim 4, wherein the outputting the editing data includes outputting the editing data to a sewing machine via a communication portion provided in the embroidery pattern displaying device.

6. The non-transitory computer-readable medium according to claim 4, wherein the editing data includes position information indicating the position of the embroidery pattern with the position of the marker as the reference.

7. The non-transitory computer-readable medium according to claim 4, wherein the editing data includes size information specifying a size of the embroidery pattern.

8. The non-transitory computer-readable medium according to claim 4, wherein the outputting the editing data includes, when the editing content with respect to the embroidery pattern is received, displaying the received editing content on the displaying portion.

9. The non-transitory computer-readable medium according to claim 3, wherein the displaying on the displaying portion includes, when the marker is detected, displaying an area image indicating an editable area of the embroidery pattern, in addition to the pattern image, superimposed on the real image with the detected marker as the reference.

10. The non-transitory computer-readable medium according to claim 9, wherein the computer-readable instructions further cause the processor to perform a step comprising:
receiving information identifying at least one of a type and size of an embroidery frame from a sewing machine via a communication portion provided in the embroidery pattern displaying device,
wherein the displaying on the displaying portion includes displaying the area image corresponding to the at least one of the identified type and the identified size of the embroidery frame, in addition to the pattern image, superimposed on the real image.

11. The non-transitory computer-readable medium according to claim 9, wherein the computer-readable instructions further cause the processor to perform steps comprising:
determining whether the pattern image displayed on the displaying portion fits within the editable area indicated by the area image displayed on the displaying portion; and
performing processing that enables only editing content of the embroidery pattern within a range in which the pattern image fits within the editable area,
wherein the reflecting includes, when the editing content with respect to the embroidery pattern is received, reflecting the editing content enabled by the processing in the pattern image displayed on the displaying portion.

12. The non-transitory computer-readable medium according to claim 9, wherein the computer-readable instructions further cause the processor to perform a step comprising:
receiving a change of a display position of the area image, within a range in which the marker is arranged within the editable area indicated by the area image,
wherein the reflecting includes, when the change of the display position of the area image is received, reflecting the change of the display position.

13. The non-transitory computer-readable medium according to claim 9, wherein the computer-readable instructions further cause the processor to perform a steps comprising:
outputting area data indicating a position of the area image with respect to a position of the marker.

14. The non-transitory computer-readable medium according to claim 1, wherein the computer-readable instructions further cause the processor to perform a step comprising:
receiving data indicating the embroidery pattern associated with the marker from a sewing machine via a communication portion provided in the embroidery pattern displaying device,
wherein the displaying on the displaying portion includes displaying the pattern image on the displaying portion on the basis of the received data from the sewing machine.

15. The non-transitory computer-readable medium according to claim 1, wherein the displaying includes, when the marker is detected, displaying a key to receive an editing content with respect to the embroidery pattern in addition to the embroidery image.

16. The non-transitory computer-readable medium according to claim 15, wherein the key includes a key to receive a command that changes a size of the embroidery pattern.

17. The non-transitory computer-readable medium according to claim 15, wherein the key includes a key to receive a command that changes an angle of the embroidery pattern.

18. The non-transitory computer-readable medium according to claim 17, wherein the computer-readable instructions further cause the processor to perform steps comprising:
detecting an outline of an object on which the marker is arranged from the real image; and
determining whether the pattern image fits within a closed region surrounded by the detected outline,
wherein the displaying includes, in response to determining that the pattern image does not fit within the closed region, displaying the pattern image in which a part of the pattern image that is outside the closed region of the outline is excluded.

19. An embroidery pattern displaying device comprising:
a capturing sensor configured to capture a real-world image that is an image of a real space of an object;
a display configured to display the real-world image captured by the capturing sensor, and a pattern image indicating an embroidery pattern;
a processor; and
a memory storing computer-readable instructions that, when executed by the processor, cause the embroidery pattern displaying device to:

detect a marker associated with the embroidery pattern to be arranged within the display as a pattern image, from the real-world image captured by the capturing sensor;

determine, when the marker is detected from the real image, a size of the pattern image based on a size of the detected marker in the real image, the pattern image indicating the embroidery pattern associated with the detected marker; and display, when the marker is detected, the pattern image having the determined size superimposed on the real-world image captured by the capturing sensor with the detected marker as a reference, on the display, a relative position of the pattern image being predetermined with respect to a position of the marker, the pattern image being automatically aligned with the marker in the relative position of the pattern image.

20. A method of controlling an embroidery pattern displaying device provide with a capturing portion and a displaying portion, the method comprising steps of:

detecting a marker associated with an embroidery pattern to be arranged within the displaying portion as a pattern image, from a real image that is a real-world image of a real-world space captured by the capturing portion;

determining, when the marker is detected from the real image, a size of the pattern image based on a size of the detected marker in the real image, the pattern image indicating the embroidery pattern associated with the detected marker; and displaying, when the marker is detected, the pattern image having the determined size superimposed on the real image captured by the capturing portion with the detected marker as a reference, on the displaying portion, a relative position of the pattern image being predetermined with respect to a position of the marker, the pattern image being automatically aligned with the marker in the relative position of the pattern image.

* * * * *